United States Patent
Todo et al.

(10) Patent No.: US 9,406,952 B2
(45) Date of Patent: Aug. 2, 2016

(54) SOLID OXIDE FUEL CELL

(75) Inventors: Yusuke Todo, Iwakura (JP); Daisuke Komatsu, Nagoya (JP); Yasuo Okuyama, Kasugai (JP); Hideki Uematsu, Konan (JP); Hiroya Ishikawa, Aichi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 620 days.

(21) Appl. No.: 13/699,906

(22) PCT Filed: May 6, 2011

(86) PCT No.: PCT/JP2011/060600
§ 371 (c)(1),
(2), (4) Date: Feb. 6, 2013

(87) PCT Pub. No.: WO2011/148769
PCT Pub. Date: Dec. 1, 2011

(65) Prior Publication Data
US 2013/0130144 A1    May 23, 2013

(30) Foreign Application Priority Data
May 26, 2010    (JP) ................................ 2010-120839

(51) Int. Cl.
*H01M 8/04* (2016.01)
*H01M 8/02* (2016.01)
*H01M 8/12* (2016.01)

(52) U.S. Cl.
CPC ........ *H01M 8/04089* (2013.01); *H01M 8/0258* (2013.01); *H01M 8/12* (2013.01); *H01M 2008/1293* (2013.01); *Y02E 60/521* (2013.01); *Y02E 60/525* (2013.01)

(58) Field of Classification Search
CPC ........................ H01M 8/04089; H01M 8/0258
See application file for complete search history.

(56) References Cited

U.S. PATENT DOCUMENTS

| 6,103,415 A | 8/2000 | Kurita et al. |
| 7,270,906 B2 | 9/2007 | Haltiner, Jr. et al. |

(Continued)

FOREIGN PATENT DOCUMENTS

| JP | 7-114936 A | 5/1995 |
| JP | 11-26007 A | 1/1999 |

(Continued)

OTHER PUBLICATIONS

JP2004319291A—English—Machine translated—Nov. 11, 2004.*

(Continued)

*Primary Examiner* — Miriam Stagg
*Assistant Examiner* — Haroon S Sheikh
(74) *Attorney, Agent, or Firm* — Sughrue Mion, PLLC

(57) ABSTRACT

A fuel battery cell includes, between a pair of upper and lower interconnectors, a gas sealing part in an air-electrode side, a separator, a fuel electrode frame, and a gas sealing part in a fuel-electrode side. The gas sealing part includes a first gas flowing path penetrating therethrough in a stacking direction of the fuel battery cell to constitute a part of gas flowing paths, and a second gas flowing path extending along a plane direction of the gas sealing part. In the gas sealing part, the first and second gas flowing paths do not communicate with each other. A third gas flowing path is formed in a member stacked on at least one of both sides of the gas sealing part in a thickness direction of the gas sealing part. Through the third gas flowing path, the first and second gas flowing paths communicate with each other.

10 Claims, 13 Drawing Sheets

(56) References Cited

U.S. PATENT DOCUMENTS

| | | | | |
|---|---|---|---|---|
| 2003/0077500 A1* | 4/2003 | Gorbell | ............... | H01M 8/0247 429/460 |
| 2009/0239129 A1* | 9/2009 | Seido | ................. | H01M 8/0206 429/437 |
| 2010/0055525 A1* | 3/2010 | Uematsu et al. | ................ | 429/30 |

FOREIGN PATENT DOCUMENTS

| | | |
|---|---|---|
| JP | 11-111312 A | 4/1999 |
| JP | 2004-319291 A | 11/2004 |
| JP | 2008-287983 A | 11/2008 |
| JP | 2009-43550 A | 2/2009 |
| JP | 2009-93835 A | 4/2009 |
| JP | 2009-217960 A | 9/2009 |
| JP | 2009-238651 A | 10/2009 |

OTHER PUBLICATIONS

International Search Report for PCT/JP2011/060600 dated Jul. 12, 2011.

* cited by examiner

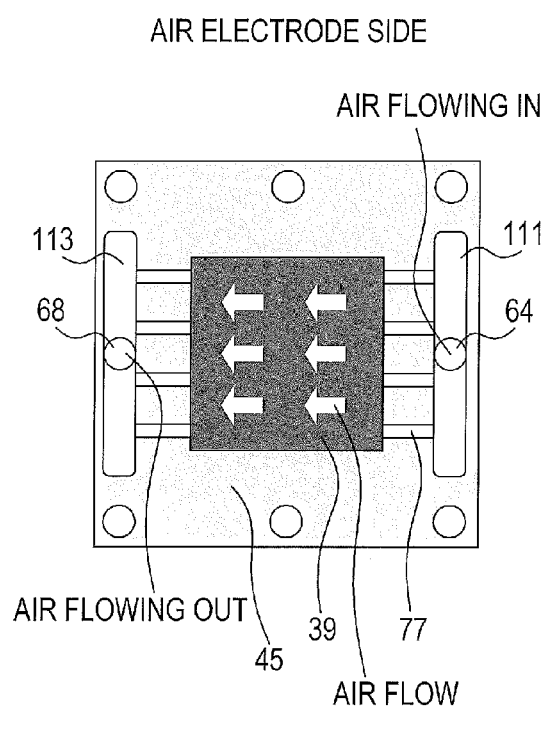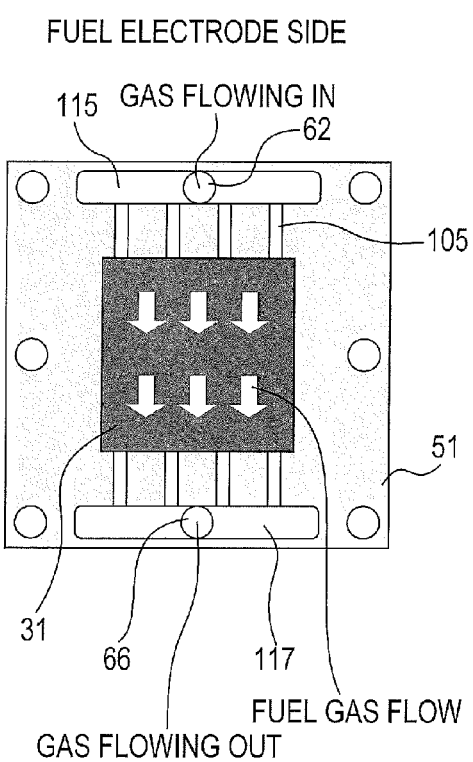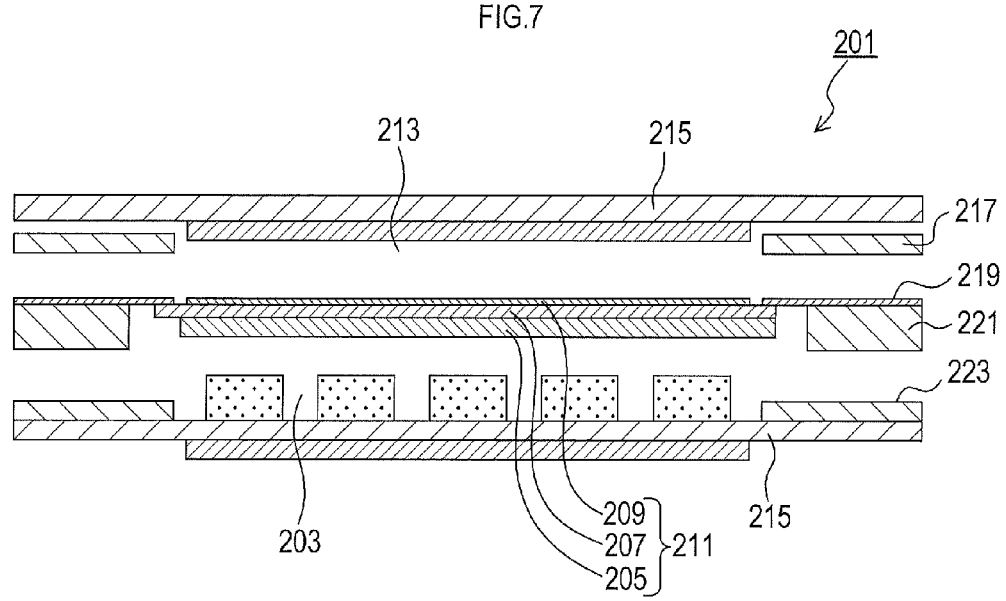

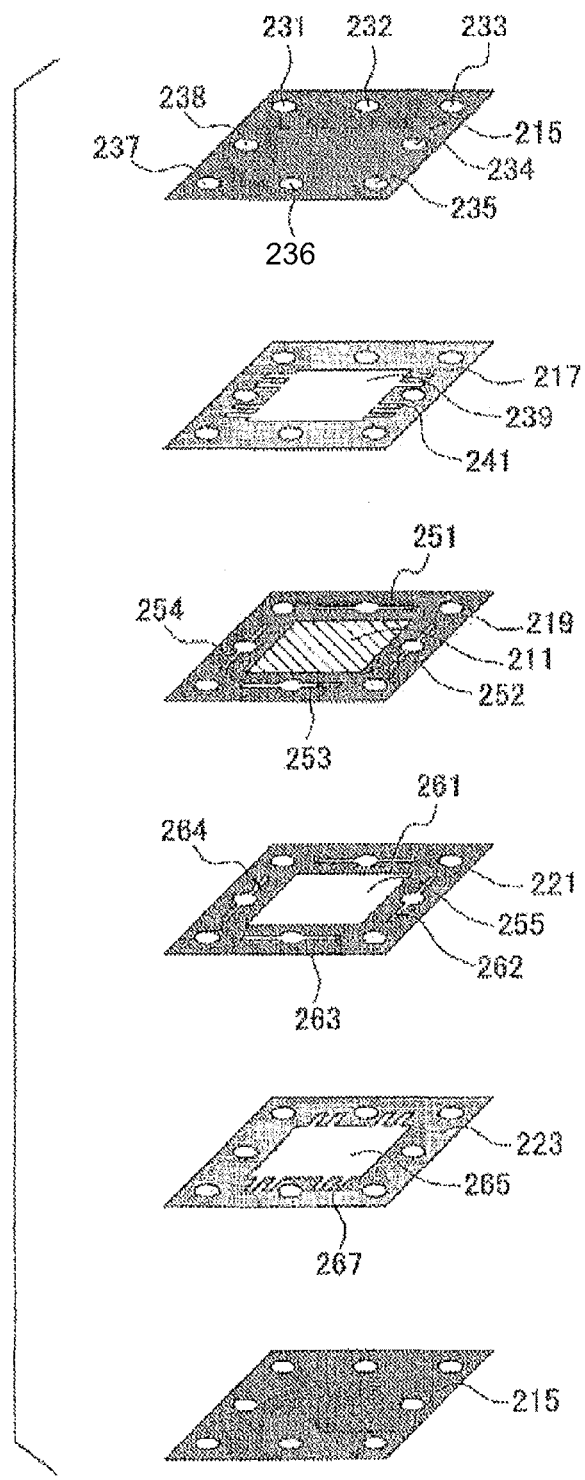

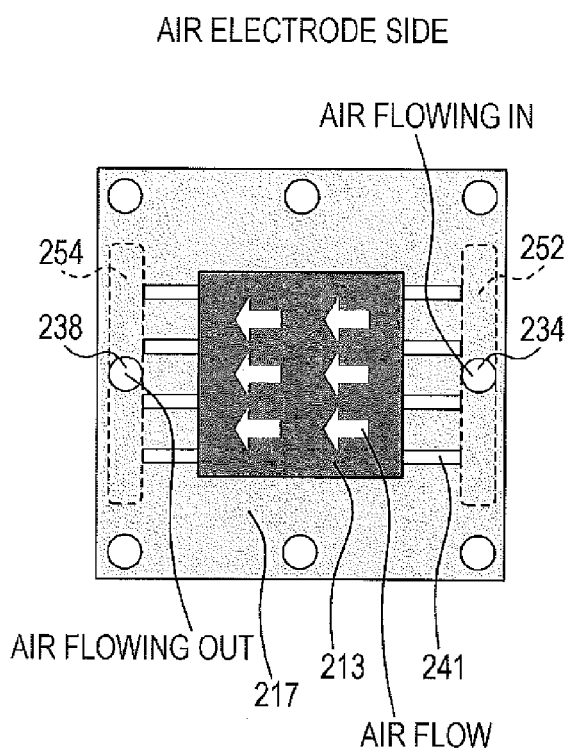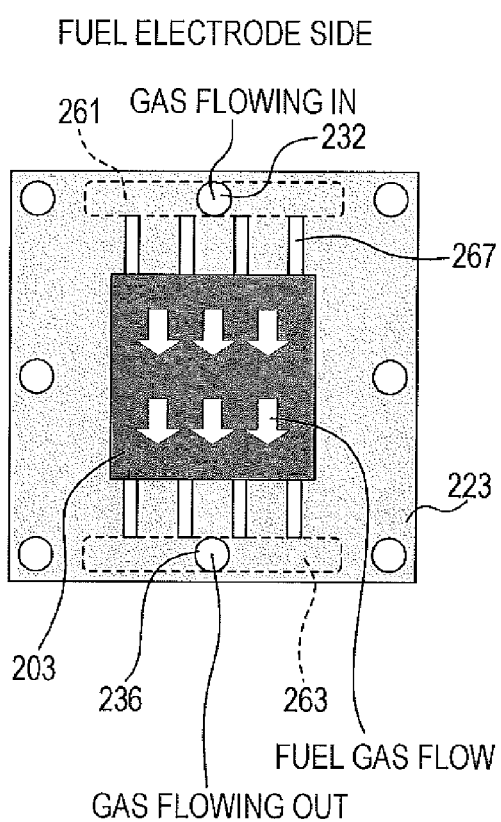

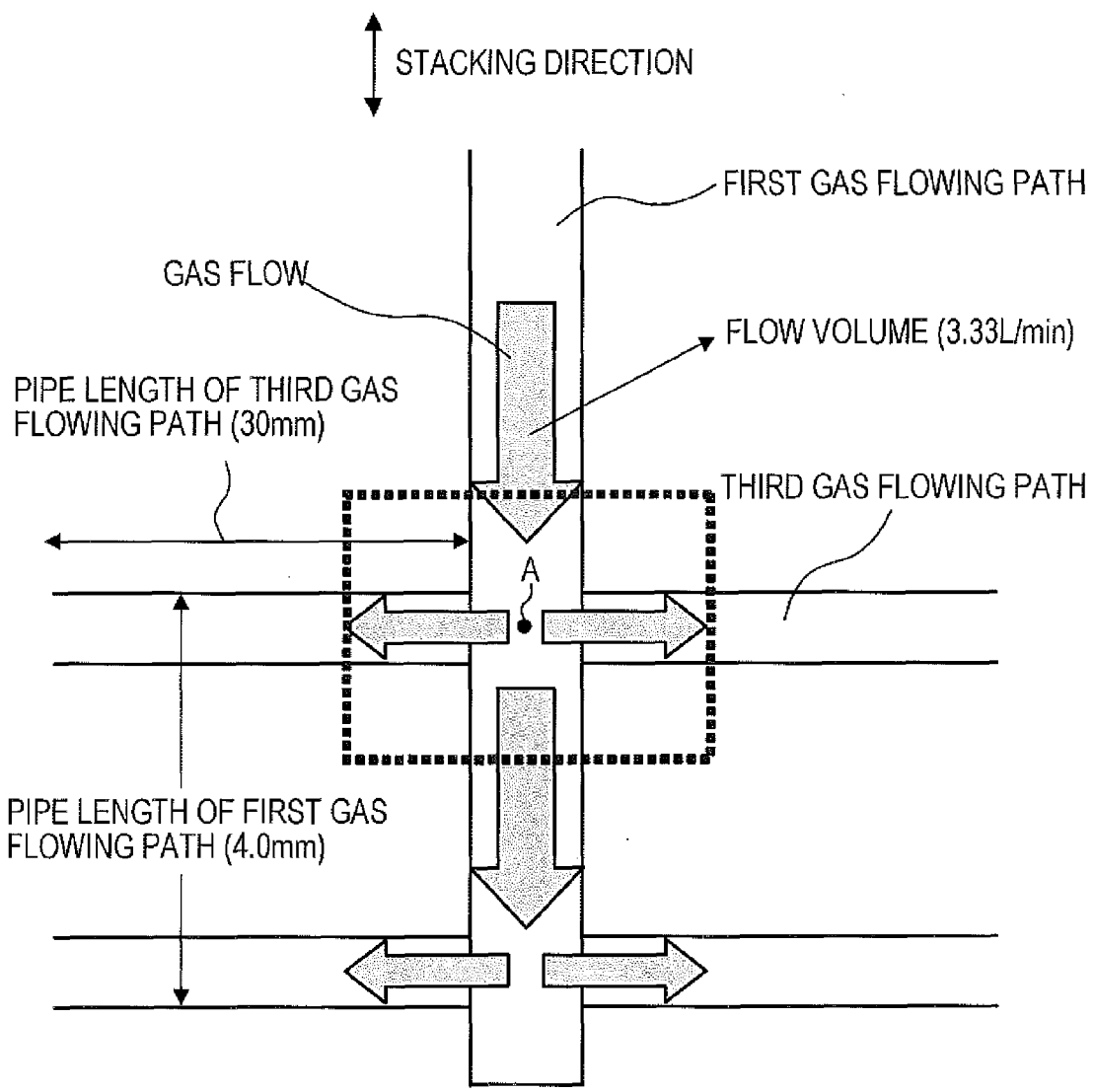

AIR ELECTRODE SIDE

FUEL ELECTRODE SIDE

FIG.16
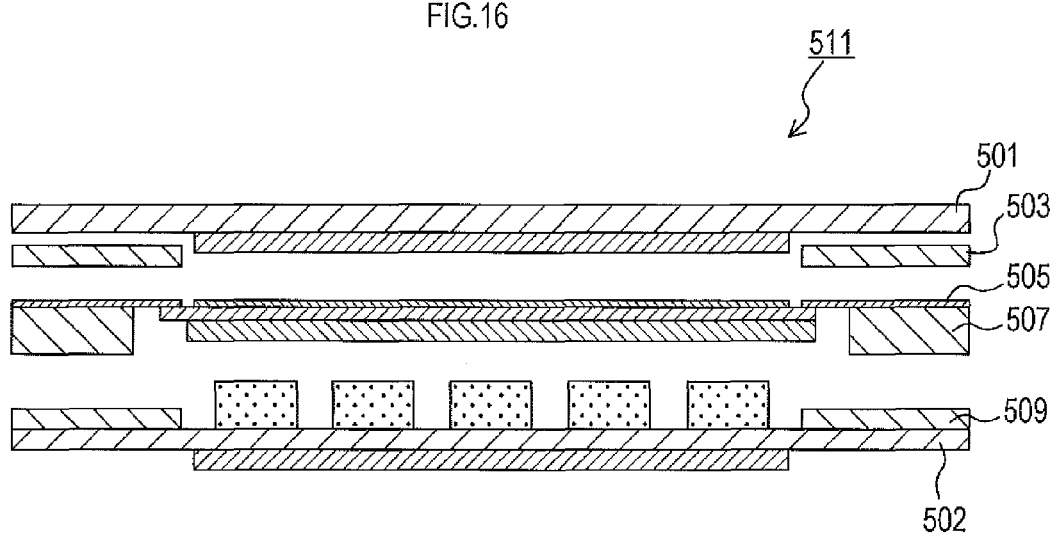
FIG.17A
AIR ELECTRODE SIDE
FIG.17B
FUEL ELECTRODE SIDE
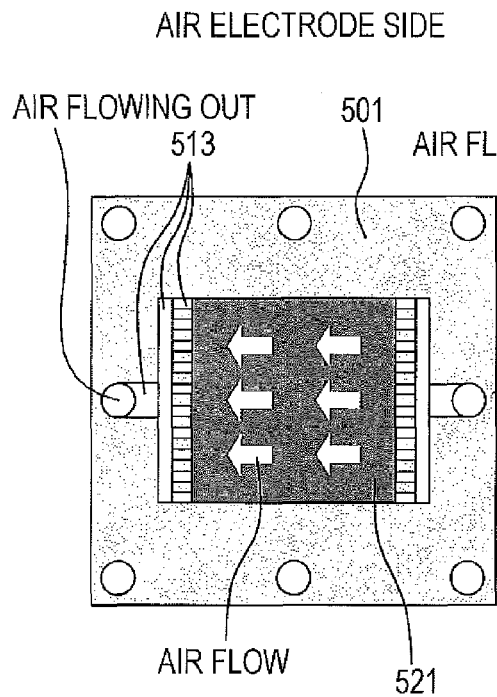
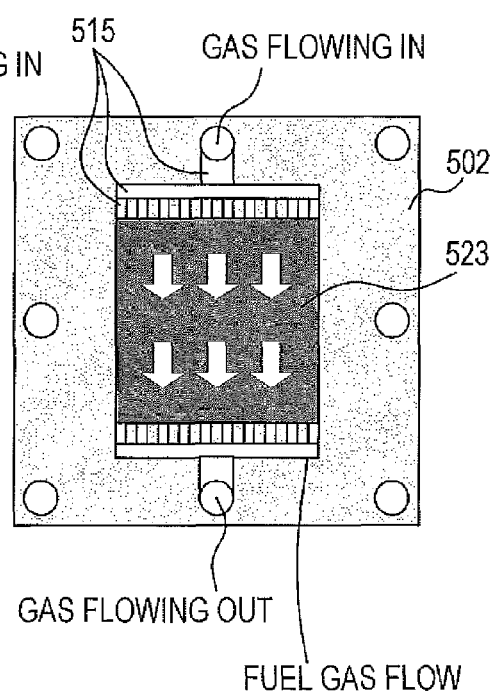

SOLID OXIDE FUEL CELL

CROSS-REFERENCE TO RELATED APPLICATIONS

This application is a National Stage of International Application No. PCT/JP2011/060600 filed May 6, 2011, claiming priority based on Japanese Patent Application No. 2010-120839 filed May 26, 2010, the contents of all of which are incorporated herein by reference in their entirety.

FIELD OF THE INVENTION

The present invention relates to a solid oxide fuel cell that includes a fuel electrode, an oxidant electrode, and a solid oxide.

BACKGROUND ART

As a fuel cell, a solid oxide fuel cell (hereinafter, also referred to as SOFC) in which a solid electrolyte (solid oxide) is used has been conventionally known.

In the SOFC, used as an electric power generation unit is a power generation cell (fuel battery cell) in which, for example, a fuel electrode to be in contact with fuel gas is provided in one side of a layer of the solid oxide and an oxidant electrode (air electrode) to be in contact with oxidant gas (atmospheric air) is provided in the other side of the layer of the solid oxide. Moreover, in order to obtain a desired voltage, a stack (fuel cell stack), in which a plurality of fuel battery cells are stack-layered by way of an interconnector, has been developed. The aforementioned fuel cell stack is configured such that fuel gas or air to be used for electric power generation is supplied from a traverse direction perpendicular to a stacking direction of the fuel battery cells. The fuel gas or air then flows along a surface of the fuel electrode and the air electrode. Thereafter, the fuel gas or the air that has been used is discharged from the traverse direction.

Moreover, conventionally, in order to introduce the fuel gas or the air into an inside of the fuel battery cell (inner space in contact with the fuel electrode and the air electrode), a gas-introduction hole (or a gas-discharge hole) and gas flowing paths which communicate with such a hole are provided in a metal frame or the interconnector constituting the fuel battery cell (see, Patent Documents 1 to 3).

Among the above conventional techniques, a fuel cell stack of a flat-plate, stacked-type needs to include a gas flowing path (first gas flowing path) penetrating fuel battery cells in a stacking direction of the fuel cell stack to supply air or fuel gas to each of the fuel battery cells, and also a flowing path (second gas flowing path) extending in a plane direction of the fuel battery cell (i.e., perpendicular to the stacking direction) to supply respective gases from the first gas flowing path to flat-plate electrodes (fuel electrode and air electrode) of each of the fuel battery cells. Generally, the second gas flowing path is formed on an interconnector or a metal frame which holds the fuel battery cell.

PRIOR ART DOCUMENTS

Patent Documents

Patent Document 1: Japanese Unexamined Patent Application Publication No. 2009-93835
Patent Document 2: Japanese Unexamined Patent Application Publication No. 11-26007
Patent Document 3: Japanese Unexamined Patent Application Publication No. 2004-319291

SUMMARY OF THE INVENTION

Problems to be Solved by the Invention

In a case of supplying gas uniformly on an overall electrode plane of the flat-plate electrode, however, if the second gas flowing path has a simple configuration, the gas does not flow uniformly within the electrode plane, thereby degrading utilization of the air or the fuel gas. Thus, it has been necessary to form the second gas flowing path having a complex geometry.

However, when the flowing path having the complex geometry (second gas flowing path) is formed of, for example, a metal frame, it may be considered to use a method of stacking the metal frame or a method of etching the metal frame. However, in order not to reduce strength of the fuel cell stack, it is necessary to increase a thickness of the metal frame by a thickness corresponding to a thickness of the flowing path. Moreover, the same problem as above exists when forming a flowing path (a complex flowing path such as the second gas flowing path) in the interconnector.

Consequently, a problem occurs in which, due to the increase of the thickness of the fuel cell stack, a temperature difference becomes greater in a central part and an end part (outer circumferential side) of the fuel cell stack or both ends in the stacking direction of the fuel cell stack when electricity is generated; therefore, operation control becomes ineffective and in some cases, breakdowns are tend to occur. Furthermore, since a heat capacity increases as a weight of the fuel cell stack increases, there are problems such as a delayed warm-up time or cost increase.

Moreover, in a case where a metal frame and others are stacked to form a flowing path, a brazing step is required. In a case where an etching process is performed, an etching step is required. Therefore, in either of the above cases, a problem exists in which working steps become complicated, causing a cost increase.

The present invention is made in view of the above problems. An object of the present invention is to provide a solid oxide fuel cell with which a thickness of the fuel cell stack can be reduced and manufacturing steps can be simplified.

Means for Solving the Problems (1) In a first aspect of the present invention, a solid oxide fuel cell includes a fuel cell stack composed of plate-like electricity generation cells stacked therein by way of an interconnector. Each of the plate-like electricity generation cells is separated, by a separator, into a side where an air electrode is provided and a side where a fuel electrode is provided. The air electrode is to be in contact with oxidant gas. The fuel electrode is to be in contact with fuel gas. The solid oxide fuel cell includes stack-layered gas flowing paths, respectively, used to flow the oxidant gas and the fuel gas in a direction of the stacking. In the solid oxide fuel cell, a plate-like gas sealing part is disposed and stacked, between the interconnector and the separator, on at least one of the side where the air electrode is provided and the side where the fuel electrode is provided. The gas sealing part includes a first gas flowing path that penetrates therethrough in the direction of the stacking to constitute a part of the stack-layered gas flowing paths, and a second gas flowing path that extends along a plane direction of the gas sealing part. Moreover, in the gas sealing part, the first gas flowing path and the second gas flowing path do not communicate with each other. Furthermore, a third gas flowing path through which the first gas flowing path communicates with the second gas flowing path is formed in a member to be stacked on at least one of both sides of the gas sealing part in a thickness direction of the gas sealing part.

In the present invention, the first gas flowing path, which penetrates the gas sealing part in the stacking direction in the fuel cell stack, and the second gas flowing path, which extends in the plane direction (a direction of a flat plane) of the power generation cell, are formed in the gas sealing part disposed between the interconnector and the separator. However, in the gas sealing part, the first gas flowing path and the second gas flowing path do not communicate with each other. Meanwhile, in the member such as an interconnector and so on, which is to be stacked in the thickness direction of the gas sealing part, there is formed the third gas flowing path which has a simple configuration and through which the first gas flowing path communicates with the second gas flowing path. That is to say, the third gas flowing path through which the first gas flowing path communicates with the second gas flowing path is formed, not in the gas sealing part, but in another member adjacent to the gas sealing part.

By this configuration, it is possible to omit use of a metal frame (of, for example, several layers to form a flowing path), which has been conventionally necessary, provided in the side where the air electrode is provided. Moreover, since there is no need to form a complex flowing path such as a conventional second gas flowing path in the interconnector, a thickness of the interconnector can be made thinner.

Consequently, since a thickness of the fuel cell can be thinner, it is possible to achieve a uniform temperature distribution at a central part and an end part (outer circumference part) of the fuel cell or at both ends of the fuel cell in the stacking direction when electricity is generated. Moreover, it is possible to reduce a period of time from when the fuel cell is started to be operated to when a temperature reaches a rated temperature.

Furthermore, it is possible to reduce working steps or processing costs necessary to form the complex flowing path in the metal frame or the interconnector. Also, it is possible to omit a brazing step for a conventional metal frame and so on.

Conventionally, in order to form a complex flowing path while ensuring strength of the fuel cell, it has been necessary to have a thick metal frame or a thick interconnector which forms the complex flowing path. In the present invention, however, since the first gas flowing path and the second gas flowing path are formed in the gas sealing part, even if the interconnector and others are thin, a sufficient strength of the fuel cell can be ensured.

(2) In a second aspect of the present invention, the gas sealing part may be disposed so as to be in contact with the separator.

In other words, instead of the conventional metal frame connecting to the separator, the above-mentioned gas sealing part can be disposed.

(3) In a third aspect of the present invention, the second gas flowing path formed in the gas sealing part may be provided to be bilaterally symmetrical with respect to the first gas flowing path when the gas sealing part is viewed from the thickness direction thereof.

This makes it possible to flow gas more uniformly, for example, in the flowing path in the side where the fuel electrode is provided or the flowing path in an oxidant gas side.

(4) In a fourth aspect of the present invention, the third gas flowing path may be branched from the first gas flowing path at a branch point A and a pressure drop index ($\Delta PA1$) on a downstream side of the branch point A in the first gas flowing path may be smaller than a pressure drop index ($\Delta PA3$) on a downstream side of the branch point A in the third gas flowing path.

That is, as illustrated in FIG. 10 which will be explained later, the above configuration enables gas to be supplied in a preferable manner such that the gas reaches flowing paths in a terminal-end side from the branch point A in the first gas flowing path (i.e., to other third gas flowing paths in the downstream side of the branch point A).

Here, the pressure drop index is defined by the following equation (1).

Pressure drop index=(flowing path length/circle-equivalent diameter of cross section of flowing path)×(flow rate)²     (1)

Now, flow rate [m/s] is expressed by flow volume [L/min]/(1000×60×cross-sectional area of flowing path [m²]). Thus, the pressure drop index can be expressed by the following equation (2).

Pressure drop index=(flowing path length [m]/circle-equivalent diameter of cross section of flowing path [m])×(flow volume [L/min]/(1000×60×cross-sectional area of flowing path [m²])²     (2)

Here, the pressure drop index can be obtained by the known Fanning's equation (3) below by using λ and γ as factors. The pipe below refers to a flowing path.

$$\Delta P = \lambda \times (L/D) \times (\gamma V^2/2) \quad (3)$$

Here, $\Delta P$: pressure drop [Pa]
λ: pipe friction factor
L: pipe length [m]
D: pipe diameter [m]
γ: gas density in pipe [kg/m³]
V: flow rate in pipe [m/s]

(5) In a fifth aspect of the present invention, the second gas flowing path may be branched from the third gas flowing path at a branch point B, and a pressure drop index ($\Delta PB3$) on a downstream side of the branch point B of the third gas flowing path may be smaller than a pressure drop index ($\Delta PB2$) on a downstream side of the branch point B in the second gas flowing path.

That is, as illustrated in FIG. 11 which will be explained later, the above configuration enables gas to be supplied in a preferable manner such that the gas reaches flowing paths in a terminal-end side from the branch point B in the third gas flowing path (i.e., to other second gas flowing paths in the downstream side of the branch point B).

(6) In a sixth aspect of the present invention, an insulating member may be disposed at a position which is at least corresponding to the second gas flowing path on at least one of the both sides of the gas sealing part in the thickness direction of the gas sealing part.

By disposing the insulating member as above, it is possible to inhibit respective members in the both sides in the thickness direction of the second gas flowing path from contacting with each other and causing a short circuit. Especially, if a thin metal plate is used as a material of the separator that separates the flowing path for the fuel gas from the flowing path for the oxidant gas, there is a possibility in which the separator enters into the second gas flowing path and contacts with the interconnector. However, by disposing the above insulating member, it is possible to inhibit such a short circuit from forming.

(7) In a seventh aspect of the present invention, the insulating member may be disposed at the side where the air electrode is provided.

This makes it possible to effectively inhibit a short circuit from forming in the side where the air electrode is provided.

(8) In an eighth aspect of the present invention, mica or vermiculite may be used as a material of the insulating member.

(9) In a ninth aspect of the present invention, mica or vermiculite may be used as a material of the gas sealing part.

(10) In a tenth aspect of the present invention, with respect to the gas sealing part, flowing paths formed by pressing processing or laser treatment may be used as the first gas flowing path and the second gas flowing path, or the third gas flowing path.

(11) In an eleventh aspect of the present invention, a solid oxide fuel cell includes a fuel cell stack composed of plate-like electricity generation cells stacked therein by way of an interconnector. Each of the plate-like electricity generation cells is separated, by a separator, into a side where an air electrode is provided and a side where a fuel electrode is provided. The air electrode is to be in contact with oxidant gas. The fuel electrode is to be in contact with fuel gas. The solid oxide fuel cell includes stack-layered gas flowing paths, respectively, used to flow the oxidant gas and the fuel gas in a direction of the stacking. In the solid oxide fuel cell, a plate-like gas sealing part is disposed and stacked, between the interconnector and the separator, on at least one of the side where the air electrode is provided and the side where the fuel electrode is provided. The gas sealing part includes a first gas flowing path that penetrates therethrough in the direction of the stacking to constitute a part of the stack-layered gas flowing paths, and a second gas flowing path that communicates with the first gas flowing path and extends along a plane direction of the gas sealing part. Moreover, the gas sealing part is composed of mica or vermiculite.

In the present invention, the first gas flowing path, which penetrates the gas sealing part in the stacking direction in the fuel cell stack, and the second gas flowing path, which extends in the plane direction (a direction of a flat plane) of the power generation cell, are formed in the gas sealing part disposed between the interconnector and the separator. Moreover, the gas sealing part is composed of mica or vermiculite.

By this configuration, it is possible to omit use of a metal frame (of, for example, several layers to form a flowing path), which has been conventionally necessary, provided in the side where the air electrode is provided. Also, since there is no need to form a complex flowing path such as a conventional second gas flowing path in the interconnector, a thickness of the interconnector can be made thinner.

Consequently, it is possible to make a thickness of the overall fuel cell be thinner. Therefore, it is possible to achieve a uniform temperature distribution at a central part and an end part (outer circumference part) of the fuel cell, or at both ends of the fuel cell in the stacking direction, at the time of the generation of electricity. Moreover, it is possible to reduce a period of time from when the fuel cell is started to be operate to when a temperature reaches a rated temperature.

Furthermore, it is possible to reduce working steps or processing costs necessary to form the complex flowing path in the metal frame or the interconnector. Also, it is possible to omit a brazing step for conventional metal frames and so on.

Conventionally, in order to form a complex flowing path while ensuring strength of the fuel cell, it was necessary to have a thick metal frame or a thick interconnector which forms the complex flowing path. In the present invention, however, since the first gas flowing path and the second gas flowing path are formed in the gas sealing part, even if the interconnector and others are thin, a sufficient strength of the fuel cell can be ensured.

(12) In a twelfth aspect of the present invention, the gas sealing part may be disposed so as to be in contact with the separator.

In other words, instead of the conventional metal frame connecting to the separator, the above-mentioned gas sealing part can be disposed.

(13) In a thirteenth aspect of the present invention, the second gas flowing path formed in the gas sealing part may be provided to be bilaterally symmetrical with respect to the first gas flowing path when the gas sealing part is viewed from a thickness direction thereof.

By this configuration, it is possible to flow gas more uniformly, for example, in the flowing path in the side where the fuel electrode is provided or the flowing path in an oxidant gas side.

(14) In a fourteenth aspect of the present invention, an insulating member may be disposed at a position which is at least corresponding to the second gas flowing path on at least one of the both sides of the gas sealing part in the thickness direction of the gas sealing part.

By disposing the insulating member as above, it is possible to inhibit respective members in the both sides in the thickness direction of the second gas flowing path from contacting with each other and causing a short circuit. Especially, if a thin metal plate is used as a material of the separator that separates the flowing path for the fuel gas from the flowing path for the oxidant gas, there is a possibility in which the separator enters into the second gas flowing path and contacts with the interconnector. However, by disposing the above insulating member, it is possible to inhibit such a short circuit from forming.

(15) In a fifteenth aspect of the present invention, the insulating member may be disposed at the side where the air electrode is provided.

By this configuration, it is possible to effectively inhibit a short circuit from forming in the side where the air electrode is provided.

(16) In a sixteenth aspect of the present invention, mica or vermiculite may be used as a material of the insulating member.

(17) In a seventeenth aspect of the present invention, with respect to the gas sealing part, flowing paths formed by pressing processing or laser treatment may be used as the first gas flowing path and the second gas flowing path.

Here, the gas sealing part of the present invention is a member that is in close contact with the interconnector and the separator and that provides a gas seal between the interconnector and the separator. Also, the gas sealing part of the present invention is not a hard metal material such as a conventional metal plate, but a member (compression seal), such as mica or vermiculite, which is deformed due to compression stress (in the stacking direction) and which closely contacts with surrounding parts, thereby providing a gas seal. It may be also possible to interpose other members (capable of providing a gas seal) such as the aforementioned insulating member, between the interconnector and the separator.

BRIEF DESCRIPTION OF THE DRAWINGS

FIG. 6A is an explanatory cross-sectional view, taken along a surface of a gas sealing part located at a side of an air electrode, showing a flow of air at the side of the air electrode, and FIG. 6B is an explanatory cross-sectional view, taken along a surface of a gas sealing part located at a side of a fuel electrode, showing a flow of fuel gas at the side of the fuel electrode;

FIG. 7 is an exploded explanatory view showing a fuel battery cell according to a second embodiment;

FIG. 8 is an exploded perspective view showing the fuel battery cell according to the second embodiment;

FIG. 9A is an explanatory cross-sectional view, taken along a surface of a gas sealing part located at a side of an air electrode, showing a flow of air at the side of the air electrode, and FIG. 9B is an explanatory cross-sectional view, taken along a surface of a gas sealing part located at a side of a fuel electrode, showing a flow of fuel gas at the side of the fuel electrode;

FIG. 10 is an explanatory view showing a branch of a first gas flowing path and a third gas flowing path in a stacking direction of a solid oxide fuel cell;

FIG. 16 is an exploded explanatory view showing a fuel battery cell according to a second comparative example; and FIG. 17A is an explanatory view showing a flow of air at a side of an air electrode, and FIG. 17B is an explanatory view showing a flow of fuel gas at a side of a fuel electrode.

EXPLANATION OF REFERENCE NUMERALS

Figure 1:
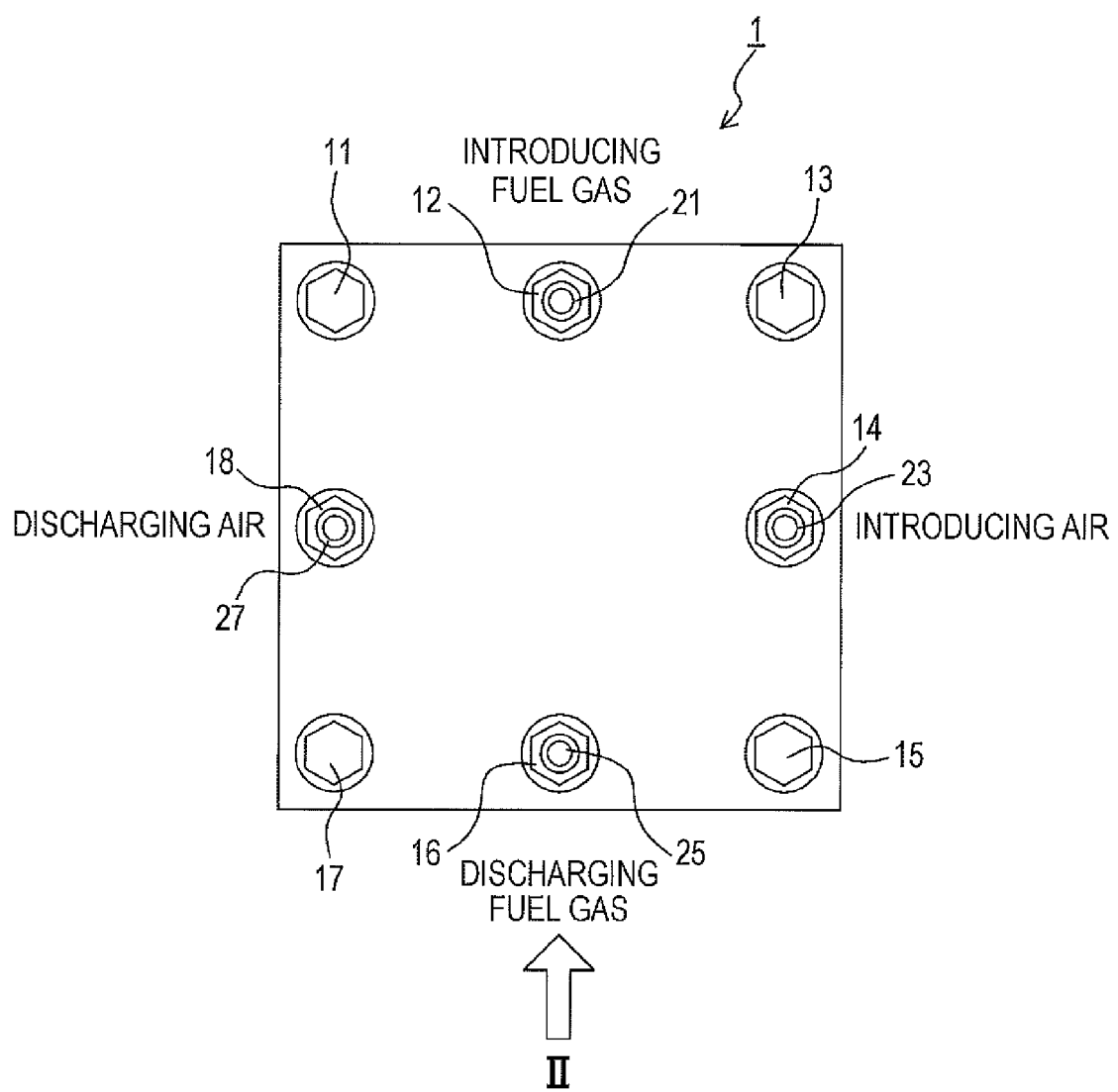
FIG. 1 is a plan view of a solid oxide fuel cell according to a first embodiment.

1 . . . solid oxide fuel cell
3, 201, 301, 413, 511 . . . fuel battery cell
5 . . . fuel cell stack
33, 205, 305 . . . fuel electrode
35, 207, 307 . . . solid oxide
37, 209, 309 . . . air electrode
43, 215, 315, 401, 501, 502 . . . interconnector
45, 51, 217, 223, 317, 323 . . . gas sealing part
47, 219, 319, 407, 505 . . . separator
49, 221, 321, 409, 507 . . . fuel electrode frame
61, 62, 63, 64, 65, 66, 67, 68, 231, 232, 234, 235, 236, 237, 238, 331, 332, 333, 334, 335, 336, 337, 338 . . . insertion hole
71, 72, 73, 74, 81, 82, 83, 84, 91, 92, 93, 94, 101, 102, 103, 104, 251, 252, 253, 254, 261, 262, 263, 264, 341, 342 . . . through hole
77, 105, 241, 267, 345 . . . cutout
325 . . . insulating frame

MODE FOR CARRYING OUT THE INVENTION

Hereinafter, an embodiment of a solid oxide fuel cell, in which the present invention is applied, will be explained with reference to the drawings.

First Embodiment a) Firstly, a schematic configuration of the solid oxide fuel cell according to the present embodiment will be described.

Figure 2:
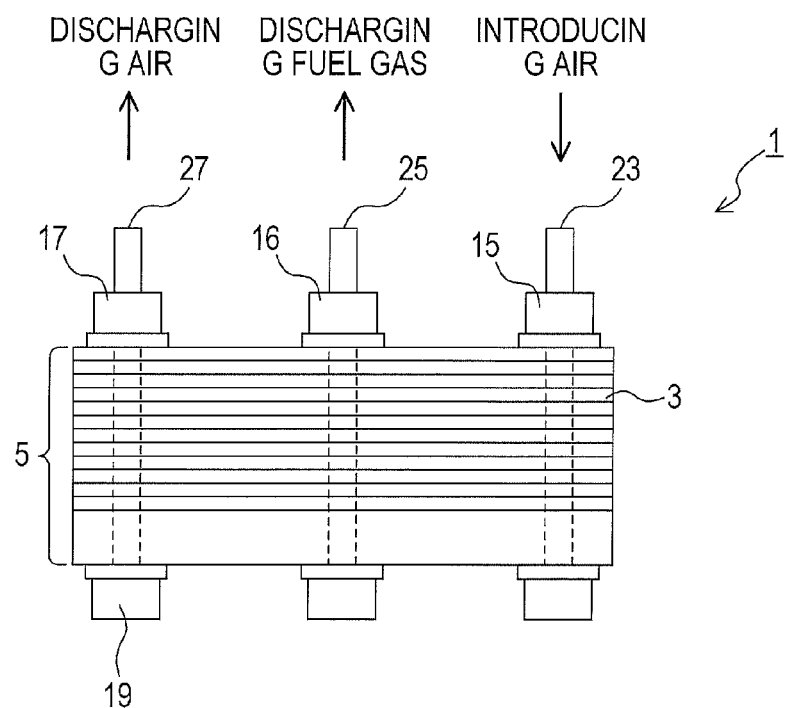
FIG. 2 is a side view of the solid oxide fuel cell according to the first embodiment, seen from a direction II in FIG. 1.

As shown in FIG. 1 and FIG. 2, a solid oxide fuel cell 1 is an apparatus that generates electricity when fuel gas (for example, hydrogen) and oxidant gas (for example, atmospheric air) are supplied.

The solid oxide fuel cell 1 includes: a fuel cell stack 5 in which a plurality of (for example, eighteen) flat-plate fuel battery cells 3 each as a unit of electric power generation (electric power generation cell) are disposed in a stack-layered manner; a plurality of bolts 11 to 18 that penetrate through the fuel cell stack 5; and nuts 19 (correctively-referred) that are screwed onto ends of the bolts 11 to 18.

As shown in FIG. 1, among the bolts 11 to 18, a second bolt 12 includes a fuel gas introduction tube 21 that supplies fuel gas to the solid oxide fuel cell 1; a fourth bolt 14 includes an air introduction tube 23 that supplies air to the solid oxide fuel cell 1; a sixth bolt 16 includes a fuel gas discharge tube 25 that discharges the used fuel gas after generation of electricity from the solid oxide fuel cell 1; an eighth bolt 18 includes an air discharge tube 27 that discharges the used air after the generation of electricity from the solid oxide fuel cell 1.

Hereinafter, each configuration will be described.

Figure 3:
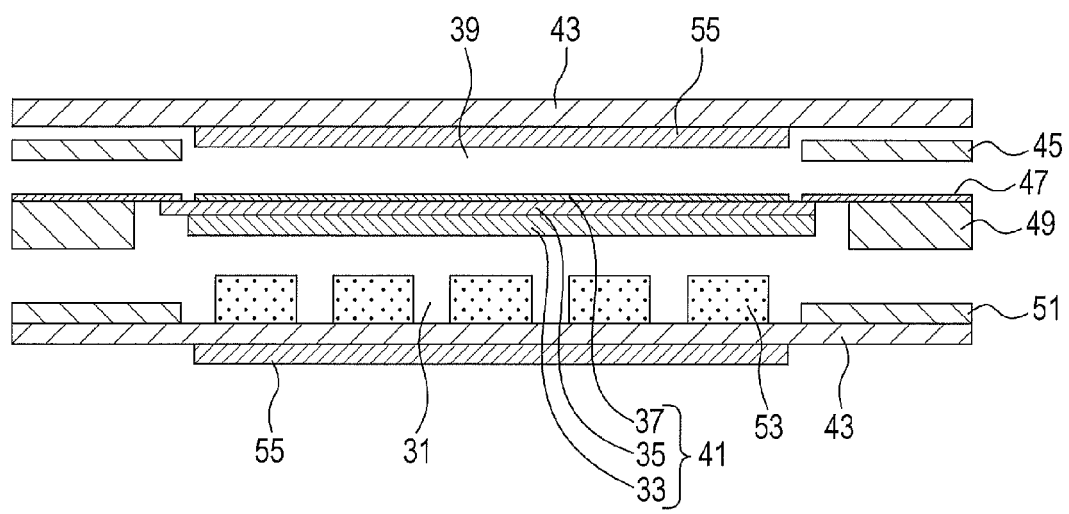
FIG. 3 is an exploded explanatory view showing a fuel battery cell according to the first embodiment.

As shown in an exploded manner in FIG. 3, the fuel battery cell 3 is a plate-like fuel battery cell of so-called fuel electrode supporting membrane type. In a side where a fuel gas flowing path 31 is provided, a plate-like fuel electrode (anode) 33 is disposed. On a surface of the fuel electrode 33, which is an upper side in FIG. 3, a solid electrolyte (solid oxide) 35 is formed as a thin film. On a surface of the solid oxide 35, which is located in a side where an air flowing path 39 is provided, an air electrode (cathode) 37 is formed as a thin film. The fuel electrode 33, the solid oxide 35, and the air electrode 37 will be referred to altogether as a cell body 41.

The fuel battery cell 3 includes a pair of upper and lower interconnectors 43 and also includes, between the interconnectors 43, a plate-like gas sealing part 45 in a side where the air electrode 37 is provided, a separator 47, a fuel electrode frame 49 disposed in the side where the fuel gas flowing path 31 is provided, and a plate-like gas sealing part 51 in a side where the fuel electrode 33 is provided (the plate-like gas sealing part 51 is disposed on an outer side (lower side in FIG. 3) from the fuel electrode frame 49). The separator 47 is connected to an upper surface of an outer peripheral portion of the cell body 41 so as to separate the air flowing path 39 from the fuel gas flowing path 31. The interconnectors 43, the gas sealing part 45, the separator 47, the fuel electrode frame 49, and the gas sealing part 51 are all stacked together to be one body to constitute the fuel battery cell 3.

Furthermore, inside the fuel battery cell 3, a fuel electrode-side current collector 53 is disposed between the fuel electrode 33 and the lower interconnector 43 located in a lower side in FIG. 3, and an air electrode-side current collector 55 is formed in an integral manner on a surface of one side (lower side in FIG. 3) of each of the interconnectors 43. The fuel cell stack 5 is composed of the plurality of fuel battery cells 3 which are electrically connected in series.

Here, as a material for the solid oxide 35, YSZ, ScSZ, SDC, GDC, perovskite oxide, and so on can be used. As a material for the fuel electrode 33, Ni, or a cermet made of Ni and ceramic can be used. As a material for the air electrode 37, perovskite oxide, various noble metal, or a cermet made of noble metal and ceramic can be used.

Hereinafter, each of members constituting the fuel battery cell 3 will be described further in detail. The fuel battery cell 3 has a square shape in a plane; therefore, the each of the members constituting the fuel battery cell 3 also has a square shape in a plane.

Figure 4:
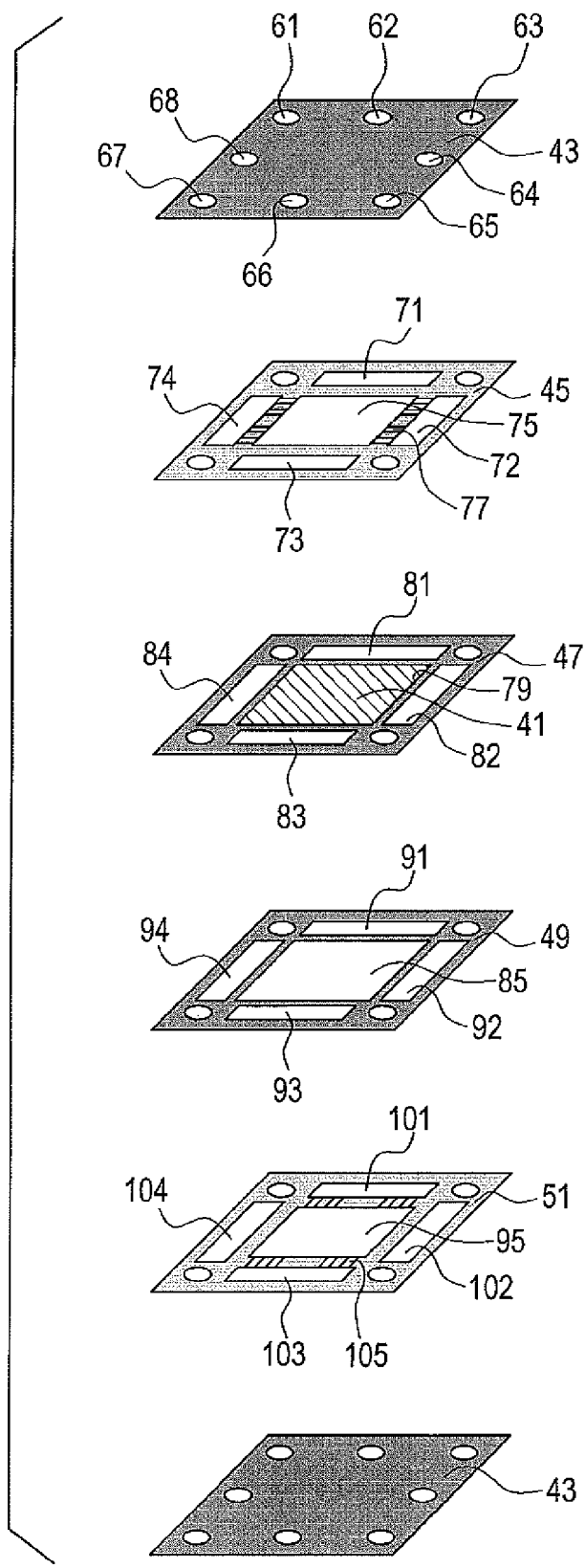
FIG. 4 is an exploded perspective view showing the fuel battery cell according to the first embodiment.

As shown in an exploded manner in FIG. 4, each of the interconnectors 43 is, for example, a plate member made of ferritic stainless and having a thickness of 0.3-2.0 mm. On an outer side of each of the interconnectors 43, insertion holes (a first to an eighth insertion holes) 61-68, each of which is, for example, a round hole having a diameter of 10 mm, are formed to be equally spaced apart from one another. Through the insertion holes 61-68, the bolts 11-18 are to be respectively inserted. That is to say, the insertion holes 61-68 are formed at eight positions which are positions of four corners of the interconnector 43 and positions of midpoints on respective sides of the interconnector 43 (here, the same reference numbers as above are assigned to insertion holes formed on the each of the members: hereinafter, reference numbers are assigned in the same manner).

The gas sealing part 45 in the side where the air electrode 37 is provided is, for example, a frame-like plate member made of mica or vermiculite and having a thickness of 0.2-1.0 mm. On four corner parts of the gas sealing part 45, the insertion holes 61, 63, 65, and 67, through which the bolts 11, 13, 15, and 17 are respectively inserted, are formed.

On end parts of four sides of the gas sealing part 45, through holes (a first to fourth through holes) 71-74 are formed along the respective sides so as to communicate, respectively, with the insertion holes 62, 64, 66, and 68 through which the bolts 12, 14, 16, and 18 are respectively inserted. Each of the through holes 71-74 has a substantially rectangular shape (length 100 mm×width 10 mm) and is configured to be a gas flowing path (a first gas flowing path). In other words, when seen from a stacking direction, the through holes 71-74 are formed to include, respectively, the insertion holes 62, 64, 66, and 68.

Here, the first through hole 71 is the first gas flowing path (that penetrates through the each of the members constituting the fuel battery cell 3 in the stacking direction) that is to be used to introduce fuel gas into the solid oxide fuel cell 1 from outside. The third through hole 73 is the first gas flowing path that is to be used to discharge the used fuel gas after the generation of electricity to an outside of the solid oxide fuel cell 1. The second through hole 72 is the first gas flowing path that is to be used to introduce air into the solid oxide fuel cell 1. The fourth through hole 74 is the first gas flowing path that is to be used to discharge the used air after the generation of electricity to an outside of the solid oxide fuel cell 1.

The through holes 71-74 are formed so as to be symmetrical with respect to a point and a line, when seen from a direction of a plate thickness of the interconnector 43. A center of the point symmetry is a gravity center (an intersection point of diagonal lines). A central axis of the line symmetry is a line connecting midpoints on respective opposing sides of the interconnector 43.

Figure 5:
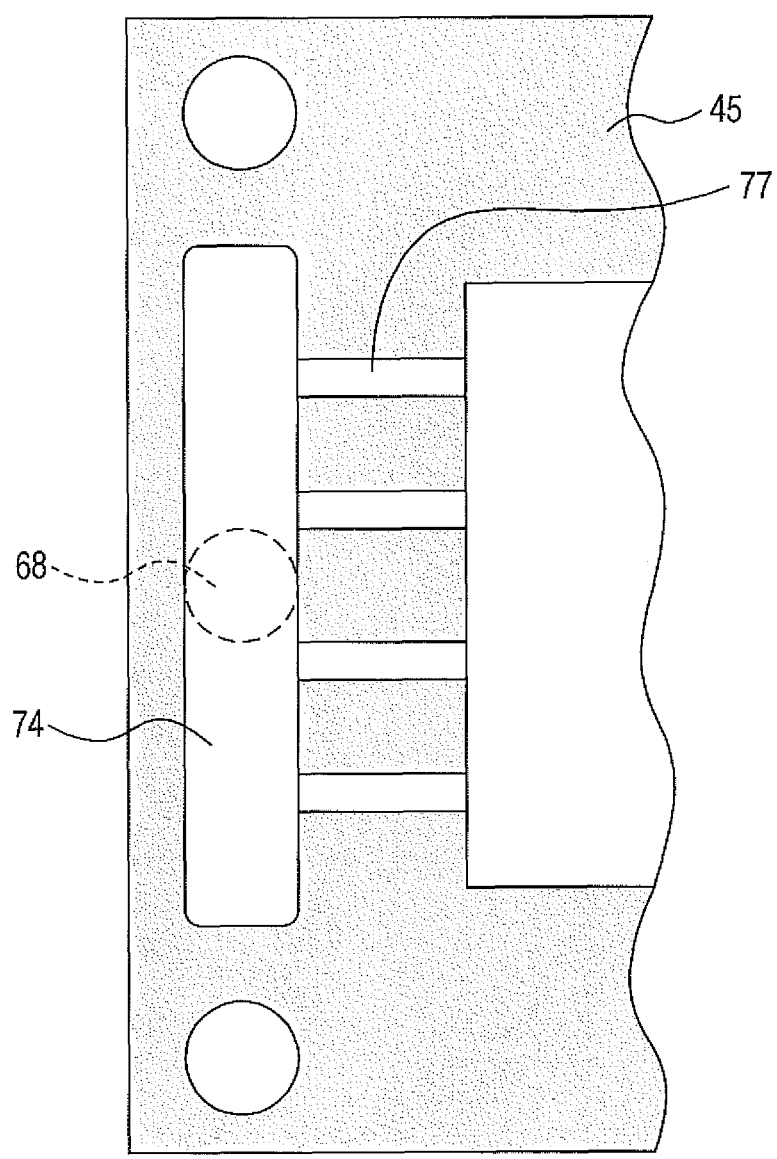
FIG. 5 is an enlarged plan view showing a part of a gas sealing part.

Especially, in the gas sealing part 45, four elongated cutouts 77, each of which has a small size (length 20 mm×width 5 mm) and is configured to be a gas flowing path (a second gas flowing path), are formed on each of a right frame part and a left frame part of the gas sealing part 45, so that a square opening 75 in a central area can communicate with the second and fourth through holes 72 and 74 located respectively in a right side and a left sight of the opening 75 (see, FIG. 5).

Each of the cutouts 77 is not a through hole but a groove formed by carving a surface of one side (on a surface side of the drawing paper of FIG. 5) of the gas sealing part 45, and can be formed by laser working or press working.

A total cross-sectional area of the cutouts 77 against a flowing direction (left-and-right direction in FIG. 4) in gas flowing paths therein (i.e., a cross-sectional area in a direction perpendicular to the flowing direction) is set to be smaller than a total cross-sectional area of the through holes 72 and 74 against a flowing direction (up-and-down direction in FIG. 4: the stacking direction) in the through holes 72 and 74 (i.e., a cross-sectional area in a direction perpendicular to the flowing direction). Moreover, each of the cutouts 77 is arranged to be symmetrical with respect to a line, as a center of the line symmetry, which connects midpoints of left and right sides; however, a number of the cutouts 77 may be set in an appropriate manner and may be, for example, six or more per one side.

The separator 47 is, for example, a frame-like plate member made of ferritic stainless and having a thickness of 0.02-0.30 mm. The separator 47 has a square opening 79 in a central area thereof, and the cell body 41 is joined to the separator 47 in such a manner to block the opening 79.

In the same manner as in the gas sealing part 45, the separator 47 has the insertion holes 61, 63, 65, and 67, which have the same shape as that in the gas sealing part 45, formed on corner parts of four corners of the separator 47. The separator 47 has through holes 81-84 (configured to be the first gas flowing paths), which have the same shape as that in the gas sealing part 45, formed along respective four sides of the separator 47.

Furthermore, the fuel electrode frame 49 has an opening 85 in a central area thereof and is, for example, a frame-like plate member made of ferritic stainless and having a thickness of 0.5-2.0 mm. In the same manner as in the separator 47, the fuel electrode frame 49 has the insertion holes 61, 63, 65, and 67, having the same shape, formed on corner parts of four corners of the fuel electrode frame 49. The fuel electrode frame 49 has through holes 91-94 (configured to be the first gas flowing paths), having the same shape, formed along respective four sides of the fuel electrode frame 49.

In the same manner as in the gas sealing part 45 in the side where the air electrode 37 is provided, the gas sealing part 51 in the side where the fuel electrode 33 is provided has an opening 95 in a central area thereof and is, for example, a frame-like plate member made of mica or vermiculite and having a thickness of 0.2-1.0 mm. The gas sealing part 51 has the insertion holes 61, 63, 65, and 67, having the same shape, formed on corner parts of four corners of the gas sealing part 51. The gas sealing part 51 has through holes 101-104 (configured to be the first gas flowing paths), having the same shape, formed along respective four sides of the gas sealing part 51.

Also, in the gas sealing part 51, four cutouts 105, each of which has a small size (length 20 mm×width 5 mm) and is configured to be a gas flowing path (a second gas flowing path), are formed on each of opposing frame parts of the gas sealing part 51, so that the opening 95 can communicate with the first and the third through holes 101 and 103. Here, the gas sealing part 45 has a planar shape the same as that of the gas sealing part 51. If the gas sealing part 45 is rotated around the gravity center as a center by 90° along a plane, the gas sealing part 45 and the gas sealing part 51 have the same planar shape.

Due to the above-explained constitution where the each of the members is stacked, the through holes 71-74, 81-84, 91-94, and 101-104 having the above same shape and provided along four sides of the fuel battery cell 3 in the stacking direction, can form quadrangular column spaces constituting the first gas flowing paths (to make gas flow in the stacking direction).

Specifically, the through holes 72, 82, 92, and 102 (whose projection shapes match with one another in the stacking direction) form a space into which air is introduced. The through holes 74, 84, 94, and 104 (which match with one another in the same manner as above) form a space into which the air is discharged. The through holes 71, 81, 91, and 101 (which match with one another in the same manner as above) form a space into which fuel gas is introduced. The through holes 73, 83, 93, and 103 (which match with one another in the same manner as above) form a space into which the fuel gas is discharged.

b) Next, explanation will be given with regard to securing, etc. by the bolts 11-18.

As shown in FIG. 1, the bolts 11-18 and the nuts 19 are connecting members that connect and secure the fuel cell stack 5 to be one body in a separable manner.

Accordingly, if the solid oxide fuel cell 1 is fastened in the stacking direction by the bolts 11-18 and the nuts 19, the fuel battery cells 3 (and the each of the members constituting the fuel battery cell 3) constituting the fuel cell stack 5 can be secured to be one body. On the other hand, if such securing by the bolts 11-18 and the nuts 19 is loosened, the fuel battery cells 3 (and the each of the members constituting the fuel battery cell 3) constituting the fuel cell stack 5 can be separated.

Among the bolts 11-18, four bolts of the bolts 11, 13, 15, and 17 respectively arranged on four corners of the solid oxide fuel cell 1 are used only for securing the fuel cell stack 5.

On the other hand, the other bolts of the bolts 12, 14, 16, and 18 are used to secure the fuel cell stack 5 and also used as flowing paths for flowing gas. Specifically, as explained later in details, the fourth insertion hole 64 and the eighth insertion hole 68, into which the fourth bolt 14 and the eighth bolt 18 are respectively inserted, are used as air flowing paths, while the second insertion hole 62 and the sixth insertion hole 66, into which the second bolt 12 and the sixth bolt 16 are respectively inserted, are used as fuel gas flowing paths.

c) Next, the gas flowing paths in the present embodiment will be explained.

<Air Flowing Path>

As shown in FIG. 6A illustrating an inside state viewed from the side where the air electrode 37 is provided, air introduced into the fuel cell stack 5 from the air introduction tube 23 is further introduced into a space 111 (first gas flowing path) via the fourth insertion hole 64 (first gas flowing path) into which the fourth bolt 14 is inserted. The space 111 is formed of the rectangular second insertion holes 72, 82, 92, and 102 of the respective members.

This air is then introduced into the air flowing path 39 in the side where the air electrode 37 is provided, from the space 111 of the first gas flowing path via the cutouts 77 (second gas flowing paths) each of which has the small size shown in a right side of FIG. 6A.

Thereafter, the remaining air which has contributed to generation of electricity within the fuel battery cell 3 is discharged to a space 113 (first gas flowing path) via the cutouts 77 (second gas flowing paths) each of which has the small size shown in a left side of FIG. 6A. The space 113 is formed of the rectangular fourth insertion holes 74, 84, 94, and 104 of the respective members.

The remaining air is discharged from the space 113 of the first gas flowing path via the eighth insertion hole 68 (first gas flowing path), into which the eighth bolt 18 is inserted, and others, and then discharged from the air discharge tube 27 to outside of the fuel cell stack 5.

<Fuel Gas Flowing Path>

As shown in FIG. 6B illustrating an inside state viewed from the side where the fuel electrode 33 is provided, fuel gas introduced into the fuel cell stack 5 from the gas introduction tube 21 is further introduced into a space 115 (first gas flowing path) via the second insertion hole 62 (first gas flowing path) into which the second bolt 12 is inserted. The space 115 is formed of the rectangular first insertion holes 71, 81, 91, and 101 of the respective members.

This fuel gas is then introduced into the fuel gas flowing path 31 in the side where the fuel electrode 33 is provided, from the space 115 of the first gas flowing path via the cutouts 105 (second gas flowing paths) each of which has the small size shown in an upper side of FIG. 6B.

Thereafter, the remaining fuel gas which has contributed to generation of electricity within the fuel battery cell 3 is discharged to a space 117 (first gas flowing path) via the cutouts 105 (second gas flowing paths) each of which has the small size shown in a bottom side of FIG. 6B. The space 117 is formed of the rectangular third insertion holes 73, 83, 93, and 103 of the respective members.

The remaining fuel gas is discharged from the space 117 of the first gas flowing path via the sixth insertion hole 66 (first gas flowing path), into which the sixth bolt 16 is inserted, and others, and then discharged from the fuel gas discharge tube 25 to outside of the fuel cell stack 5.

d) Effects of the present embodiment will be explained.

In the present embodiment, the first gas flowing paths and the second gas flowing paths are formed in each of the gas sealing parts 45 and 51. By this configuration, it is possible to omit use of metal frames (for several layers to form a flowing path), which have been conventionally necessary, in the side where the air electrode 37 is provided. Also, since there is no need to form complex flowing paths to be used as second gas flowing paths in the interconnector 43, a thickness of the interconnector 43 can be made thinner.

Consequently, it is possible to make a thickness of the solid oxide fuel cell 1 be thinner. Therefore, it is possible to achieve a uniform temperature distribution at a central part and an end part (outer circumference part) of the solid oxide fuel cell 1 or at both ends of the solid oxide fuel cell 1 in the stacking direction when electricity is generated. Moreover, it is possible to reduce a period of time from when the solid oxide fuel cell 1 is started to be operate, to when the temperature reaches a rated temperature.

Furthermore, it is possible to reduce working steps or processing costs necessary to form the complex flowing paths in the metal frames or the interconnectors 43. Moreover, it is possible to omit a brazing step for conventional metal frames and so on.

In order to form complex flowing paths while ensuring strength of the solid oxide fuel cell 1, it has been conventionally necessary to make the metal frames or the interconnectors 43 that form flowing paths be thick. In the present embodiment, however, the first gas flowing path and the second gas flowing path are formed in each of the gas sealing parts 45 and 51; therefore, even if the interconnectors 43 are thin, the strength of the solid oxide fuel cell 1 can be ensured sufficiently.

Moreover, the four cutouts 77 and the four cutouts 105 (second gas flowing path), respectively, on the sides of the gas sealing part 45 and gas sealing part 51, are formed to be symmetrical with respect to a line as a center of arrangement of the first gas flowing paths (in other words, the line connecting the midpoints on the respective opposing sides, as a center of the line symmetry). Therefore, it is possible to make the air or the fuel gas flow uniformly with respect to the air electrode 37 or the fuel electrode 33.

Second Embodiment

Now, a second embodiment will be explained; however, explanations which are the same as those in the first embodiment will not be repeated.

In the present embodiment, the gas sealing parts include the first gas flowing paths and the second gas flowing paths, and each of the separator and the fuel electrode frame includes third gas flowing paths through which the first gas flowing paths communicate with the second gas flowing paths.

a) Firstly, explanation will be given with regard to configurations of fuel battery cells constituting a solid oxide fuel cell in the present embodiment.

As shown in FIG. 7, a fuel battery cell 201 constituting the solid oxide fuel cell in the present embodiment is formed, in the same manner as in the first embodiment, as follows: a fuel electrode 205 is disposed in a side where a fuel gas flowing path 203 is provided; a solid oxide 207 is formed on a surface of the fuel electrode 205 at an upper side in FIG. 7; and an air electrode 209 is formed on a surface of the solid oxide 207 in a side where an air flowing path 213 is provided. The fuel electrode 205, the solid oxide 207, and the air electrode 209 will be referred to altogether as a cell body 211.

In the same manner as in the first embodiment, the fuel battery cell 201 includes a pair of upper and lower interconnectors 215 and also includes, between the interconnectors 215, a gas sealing part 217 in a side where the air electrode 209 is provided, a separator 219 to which the cell body 211 is joined, a fuel electrode frame 221, and a gas sealing part 223 in a side where the fuel electrode 205 is provided.

Specifically, as shown in an exploded manner in FIG. 8, each of the interconnectors 215 is, for example, a plate member made of ferritic stainless and having a thickness of 0.3-2.0 mm. On an outer side of each of the interconnectors 215, insertion holes (a first to an eighth insertion holes) 231-238 are formed respectively at eight positions in the same manner as in the first embodiment.

Moreover, the gas sealing part 217 in the side where the air electrode 209 is provided is, for example, a frame-like plate member made of mica or vermiculite and having a thickness of 0.5 mm. On an outer peripheral side of the gas sealing part 217, the insertion holes 231-238 are formed respectively at eight positions in the same manner as in the interconnectors 215.

Furthermore, in the gas sealing part 217, four cutouts 241 (configured to be second gas flowing paths) are formed in each of a right side and a left side from an opening 239, and extend in a right-and-left direction of FIG. 8, so as to communicate with the opening 239 in a central area of the gas sealing part 217.

Here, in the gas sealing part 217, the insertion holes 231-238 (configured to be the first gas flowing paths) do not communicate with the cutouts 241 (configured to be the second gas flowing paths).

The cutouts 241 are formed to penetrate the gas sealing part 217 in a direction of a plate thickness of the gas sealing part 217, and formed to be symmetrical with respect to a line, as a center of the line symmetry, which connects midpoints of left and right sides of the gas sealing part 217. Moreover, the cutouts 241 extend outward from the opening 239 in the right-and-left direction. Edges of the cutouts 241 are formed to reach positions at which the edges overlap with a second and a fourth through holes 252 and 254 (which constitute later-explained third gas flowing paths), respectively, on a right side and a left side of the separator 219.

Furthermore, the separator 219 is, for example, a frame-like plate member made of ferritic stainless and having a thickness of 0.02-0.30 mm. The separator 219 has the insertion holes 231-238 formed respectively at eight positions, in the same manner as in the gas sealing part 217.

Among the insertion holes 231-238, each of the second, the fourth, the sixth, and the eighth insertion holes 232, 234, 236, 238 includes through holes (a first to the fourth through holes) 251-254 having a rectangular shape (strip shape) (length 100 mm×width 10 mm), each of which constitutes the third gas flowing path.

Furthermore, the fuel electrode frame 221 has an opening 255 located in a central area thereof and is, for example, a frame-like plate member made of ferritic stainless and having a thickness of 0.5-2.0 mm. In the same manner as in the separator 219, the fuel electrode frame 221 has the insertion holes 231-238 formed respectively at eight positions thereof and also has, at four positions, through holes 261-264 each of which has the same shape as that of the through holes 251-254 (so as to match the shape of the through holes 251-254).

Furthermore, in the same manner as in the gas sealing part 217 in the side where the air electrode 209 is provided, the gas sealing part 223 in the side where the fuel electrode 205 is provided has an opening 265 in a central area thereof and is, for example, a frame-like plate member made of mica and having a thickness of 0.2-1.0 mm. On a peripheral part of the gas sealing part 223, the insertion holes 231-238 are formed at eight positions in the same manner as in the gas sealing part 239.

Also, in the gas sealing part 223, four cutouts 267 (configured to be the second gas flowing paths) are formed on each of opposing frame parts of the gas sealing part 223 in an extending manner toward outer sides thereof, so as to communicate with the opening 265.

Here, in the gas sealing part 223, the insertion holes 231-238 (configured to be the first gas flowing paths) do not communicate with the cutouts 267 (configured to be the second gas flowing paths). Furthermore, the cutouts 267 are formed to penetrate the gas sealing part 223 in a direction of a plate thickness of the gas sealing part 223.

The gas sealing part 217 has a planar shape the same as that of the gas sealing part 223. If the gas sealing part 217 is rotated around the gravity center as a center by 90° along a plane, the gas sealing part 217 and the gas sealing part 223 have the same planar shape.

Moreover, the cutouts 267 extend outward from the opening 265. Edges of the cutouts 267 are formed to reach positions at which the edges overlap with the first and the third through holes 261 and 263 (which constitute the third gas flowing paths), respectively, on an upper side and a lower side of the fuel electrode frame 221.

b) Next, the gas flowing paths in the present embodiment will be explained.

<Air Flowing Path>

As shown in FIG. 9A illustrating an inside state viewed from the side where the air electrode 209 is provided, air introduced into the solid oxide fuel cell from outside is further introduced into the through hole 252 (third gas flowing path) in the separator 219 via the fourth insertion hole 234 (first gas flowing path).

This air is then introduced into the air flowing path 213 in the side where the air electrode 209 is provided, from the second through hole 252 as the third gas flowing path via the cutouts 241 (second gas flowing paths) each of which has the small size shown in a right side of FIG. 9A.

Thereafter, the remaining air which has contributed to generation of electricity within the fuel battery cell 201 is discharged to the fourth through hole 254 (third gas flowing path) of the separator 219 via the cutouts 241 (second gas flowing paths) each of which has the small size shown in a left side of FIG. 9A.

Then, the remaining air is discharged from the fourth through hole 254 as the third gas flowing path via the eighth insertion hole 238 (first gas flowing path), to outside of the solid oxide fuel cell.

<Fuel Gas Flowing Path>

As shown in FIG. 9B illustrating an inside state viewed from the side where the fuel electrode 205 is provided, fuel gas introduced into the solid oxide fuel cell from outside is further introduced into the first through hole 261 (third gas flowing path) of the fuel electrode frame 221 via the second insertion hole 232 (first gas flowing path).

This fuel gas is then introduced into the fuel gas flowing path 203 in the side where the fuel electrode 205 is provided, from the first through hole 261 as the third gas flowing path via the cutouts 267 (second gas flowing paths) each of which has the small size shown in an upper side of FIG. 9B.

Thereafter, the remaining fuel gas which has contributed to generation of electricity within the fuel battery cell 201 is discharged to the third through hole 263 (third gas flowing path) of the fuel electrode frame 221 via the cutouts 267 (second gas flowing paths) each of which has the small size shown in a bottom side of FIG. 9B.

Then, the remaining fuel gas is discharged from the third through hole 263 as the third gas flowing path via the sixth insertion hole 236 (first gas flowing path) to outside of the solid oxide fuel cell.

c) Next, explanation will be given with regard to a relationship of pressure of gas in the first to the third gas flowing paths.

Since the first to the third gas flowing paths are formed in the present embodiment, the relationship of pressure of gas in the first to the third gas flowing paths will be explained.

As schematically shown in FIG. 10, in the present embodiment, the third gas flowing path is branched from the first gas flowing path at a branch point A in the stacking direction in the solid oxide fuel cell, and a pressure drop index (ΔPA1) of the first gas flowing path on a downstream side of the branch point A is set to be smaller than a pressure drop index (ΔPA3) of the third gas flowing path on a downstream side of the branch point A.

That is to say, in an area within broken lines in FIG. 10, gas (fuel gas or air) is to be branched into the third gas flowing path and the first gas flowing path; in this case, if the pressure drop index of the first gas flowing path is greater than the pressure drop index of the third gas flowing path, the gas is less likely to be supplied to other third gas flowing paths located at the downstream side (terminal-end side) of the branch point A. This is why the pressure drop indexes are set as explained above in this embodiment.

Next, the reason why the above-explained relationship of the pressure drop indexes is necessary will be explained by actually defining each value in the solid oxide fuel cell.

Now, consideration will be given to a case, as shown in FIG. 10, in which a ratio of a gas flow volume in a terminal end of the first gas flowing path to a gas flow volume in the third gas flowing path closest to the terminal end, is 1:1.

In this case, values for dimensions and so on are defined as follows.

| | |
|---|---|
| A length of the third gas flowing path (pipe length) | 30 mm |
| A cross sectional area of the third gas flowing path | 30 mm² |
| A circle-equivalent diameter of the cross section of the third gas flowing path | 0.003090 m |
| A flow volume in the third gas flowing path | 3.33 L/min |

Accordingly, based on the aforementioned equation (2), the pressure drop index (ΔPA3) is expressed as 33.2.

| | |
|---|---|
| A length of the first gas flowing path (pipe length) | 4 mm |
| A cross sectional area of the first gas flowing path | 120 mm² |
| A circle-equivalent diameter of the cross section of the first gas flowing path | 0.001236 m |
| A flow volume in the first gas flowing path | 3.33 L/min |

Accordingly, based on the aforementioned equation (2), the pressure drop index (ΔPA1) is expressed as 0.069.

Thus, the pressure drop index (ΔPA3)>the pressure drop index (ΔPA1) can be understood.

Figure 11:
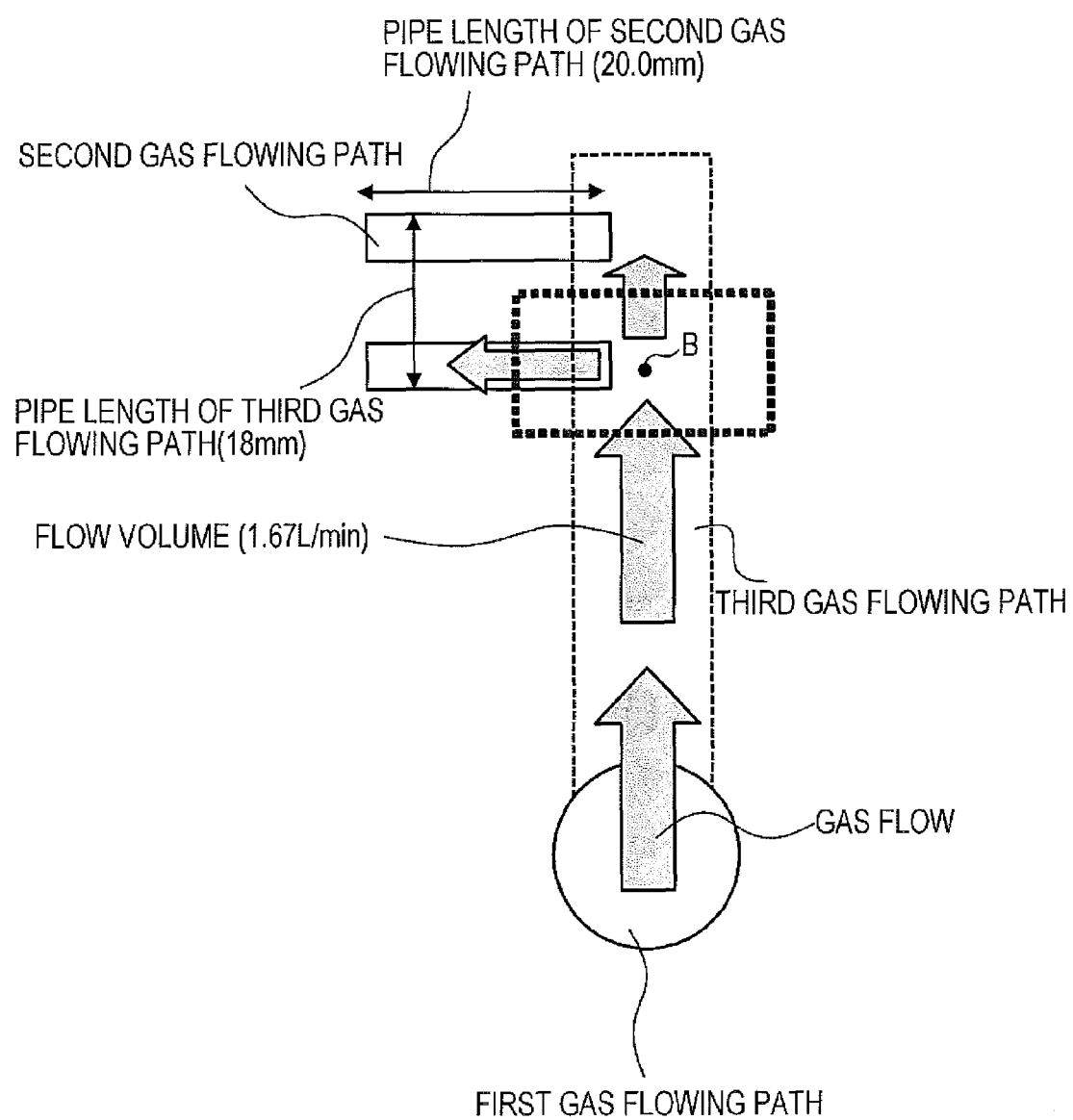
FIG. 11 is an explanatory view showing a branch of the third gas flowing path and a second gas flowing path in a plane direction of the gas sealing part.

Also, as schematically shown in FIG. 11, in the present embodiment, the second gas flowing path is branched from the third gas flowing path at a branch point B in a plane direction perpendicular to the stacking direction, and a pressure drop index (ΔPB3) of the third gas flowing path on a downstream side of the branch point B is set to be smaller than a pressure drop index (ΔPB2) of the second gas flowing path on a downstream side of the branch point B.

That is to say, in an area within broken lines in FIG. 11, gas is to be branched into the second gas flowing path and the third gas flowing path; in this case, if the pressure drop index of the third gas flowing path is greater than the pressure drop index of the second gas flowing path, the gas is less likely to be supplied to other second gas flowing paths located at the downstream side (terminal-end side) of the branch point B. This is why the pressure drop indexes are set as explained above in this embodiment.

Next, the reason why the above-explained relationship of the pressure drop indexes is necessary will be explained by actually defining each value in the solid oxide fuel cell.

Now, consideration will be given to a case, as shown in FIG. 11, in which a ratio of a gas flow volume in a terminal end of the third gas flowing path to a gas flow volume in the second gas flowing path closest to the terminal end, is 1:1.

In this case, values for dimensions and so on are defined as follows.

| | |
|---|---|
| A length of the second gas flowing path (pipe length) | 20 mm |
| A cross sectional area of the second gas flowing path | 2.5 mm² |
| A circle-equivalent diameter of the cross section of the second gas flowing path | 0.001784 m |
| A flow volume in the second gas flowing path | 1.67 L/min |

Accordingly, based on the aforementioned equation (2), the pressure drop index ΔPB2) is expressed as 1390.

| | |
|---|---|
| A length of the third gas flowing path (pipe length) | 18 mm |
| A cross sectional area of the third gas flowing path | 15 mm² |
| A circle-equivalent diameter of the cross section of the third gas flowing path | 0.004370 m |
| A flow volume in the third gas flowing path | 1.67 L/min |

Accordingly, based on the aforementioned equation (2), the pressure drop index ΔPB3) is expressed as 14.18.

Thus, the pressure drop index (ΔPB2)>the pressure drop index (ΔPB3) can be understood.

d) In the present embodiment, the first gas flowing paths and the second gas flowing paths are formed in each of the gas sealing parts 217 and 223. Also, the third gas flowing paths, through which the first gas flowing paths communicate with the second gas flowing paths, are formed in the each of the separator 219 and the fuel electrode frame 221 adjacent, respectively, to the gas sealing parts 217 and 223. In other words, the first gas flowing path and the second gas flowing path do not communicate with each other in the gas sealing parts 217 and 223. Therefore, according to the present embodiment, effects the same as those in the first embodiment can be obtained.

Third Embodiment

Next, a third embodiment will be explained; however, explanations which are the same as those in the second embodiment will not be repeated.

In the present embodiment, the gas sealing parts include the first gas flowing paths and the second gas flowing paths, and each of the separator and the fuel electrode frame includes third gas flowing paths, through which the first gas flowing paths communicate with the second gas flowing paths. Furthermore, an insulating member is disposed adjacent to the gas sealing part.

a) Firstly, explanation will be given with regard to configurations of fuel battery cells constituting a solid oxide fuel cell in the present embodiment.

Figure 12:
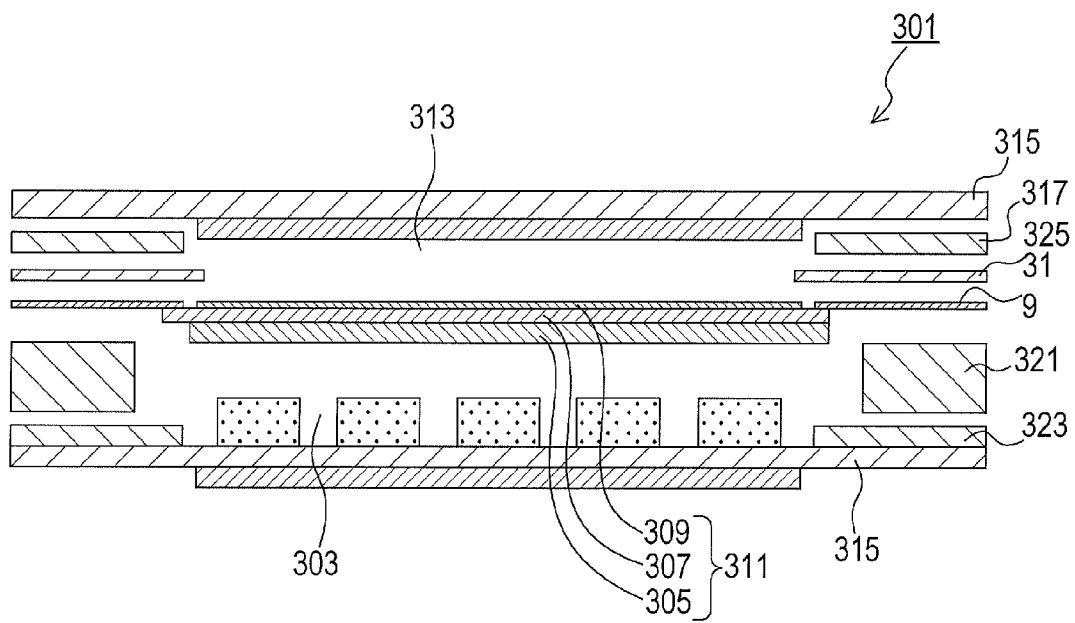
FIG. 12 is an exploded explanatory view showing a fuel battery cell according to a third embodiment.

As shown in FIG. 12, a fuel battery cell 301 constituting the solid oxide fuel cell in the present embodiment is formed, in the same manner as in the second embodiment, as follows: a fuel electrode 305 is disposed in a side where a fuel gas flowing path 303 is provided; a solid oxide 307 is formed on a surface of the fuel electrode 305 at an upper side in FIG. 12; and an air electrode 309 is formed on a surface of the solid oxide 307 in a side where an air flowing path 313 is provided. The fuel electrode 305, the solid oxide 307, and the air electrode 309 will be referred to altogether as a cell body 311.

In the same manner as in the second embodiment, the fuel battery cell 301 includes a pair of upper and lower interconnectors 315 and also includes, between the interconnectors 315, a gas sealing part 317 in a side where the air electrode 309 is provided, a separator 319 to which the cell body 311 is joined, a fuel electrode frame 321, and a gas sealing part 323 in a side where the fuel electrode 305 is provided. Especially in the present embodiment, the fuel battery cell 301 further includes an insulating frame 325 between the gas sealing part 317 and the separator 319. As explained later, the insulating frame 325, as an insulating member, provides electrical disconnection.

Figure 13:
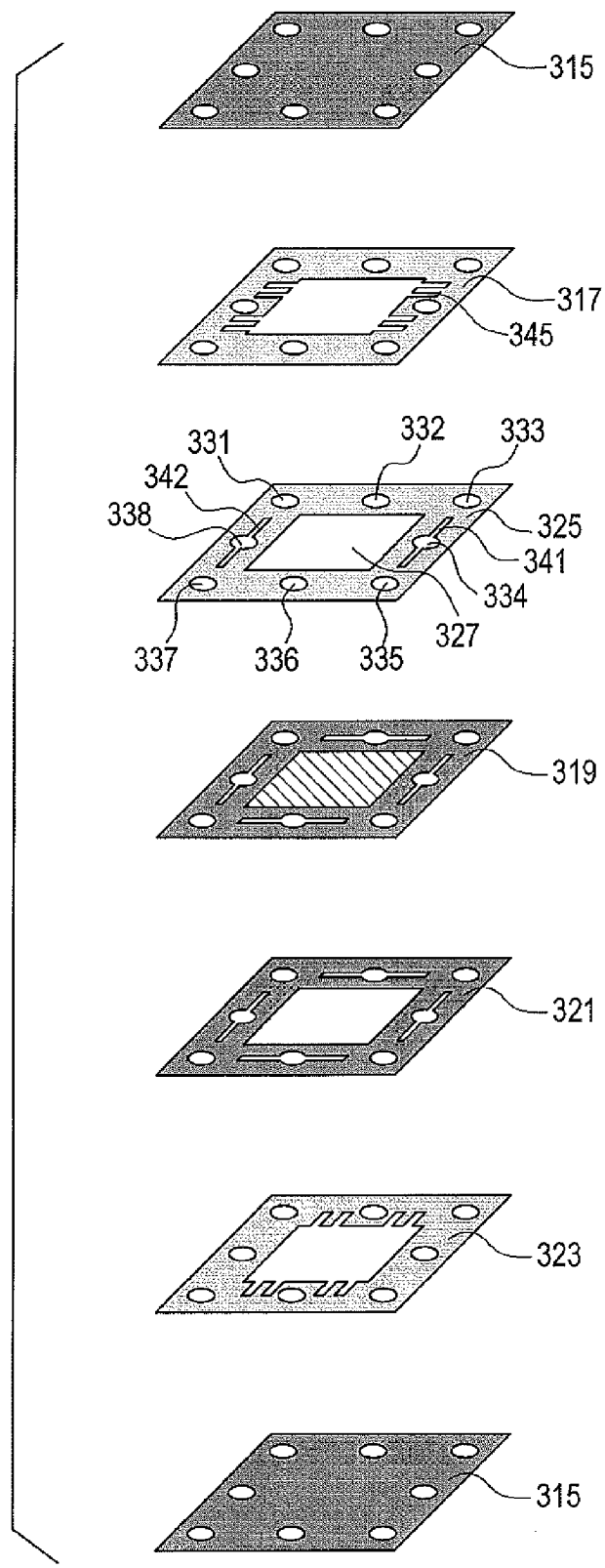
FIG. 13 is an exploded perspective view showing the fuel battery cell according to the third embodiment.

Specifically, as shown in an exploded manner in FIG. 13, materials and shapes of the interconnectors 315, 315, the gas sealing part 317, the separator 319, the fuel electrode frame 321, and the gas sealing part 323 in the present embodiment are the same as those in the second embodiment. The interconnectors 315, 315, the gas sealing part 317, the separator 319, the fuel electrode frame 321, and the gas sealing part 323 in the present embodiment include insertion holes constituting first gas flowing paths, through holes constituting third gas flowing paths, cutouts constituting second gas flowing paths, and others in the same manner as in the second embodiment.

Especially in the present embodiment, the insulating frame 325 is, for example, a square frame-like plate member made of mica or vermiculite and having a thickness of 0.12 mm. On an outer peripheral side of a square opening 327 in the insulating frame 325, insertion holes (a first to an eighth insertion holes) 331-338 are formed at eight positions in the same manner as in the interconnectors 315 and others.

In the insulating frame 325, strip-shaped communication holes 341 and 342 are formed in such a manner to extend along sides of the insulating frame 325, respectively, from the fourth insertion hole 334 and the eighth insertion hole 338 located on right and left sides, respectively, of the insulating frame 325. The communication holes 341 and 342 communicate, respectively, with the fourth and the eighth insertion holes 334 and 338. The communication holes 341 and 342 have the same shape as those of communication holes on a right side and a left side of the separator 319 and the fuel electrode frame 321, so as to form a single space.

The insulating frame 325 is configured to inhibit the separator 319, which is a thin film, from entering into small-sized cutouts 345 of the gas sealing part 317 to contact with the interconnector 315, and therefore, to inhibit a short circuit from forming. For this reason, a width of the insulating frame 325 (a width of a frame part) is formed to be greater than a width of the gas sealing part 317 so as to cover the overall area of the cutouts 345 in the gas sealing part 317.

As above, the present embodiment can achieve effects the same as those in the second embodiment and provide an advantage of inhibiting a short circuit from forming between the separator 319 and the interconnector 315.

EXPERIMENT

Now, explanations will be given with regard to experiments conducted to confirm the effects of the present invention.

Solid oxide fuel cell batteries having configurations as shown in a first comparative example and a second comparative example were made and performances thereof were studied.

(1) First Comparative Example

Figure 14:
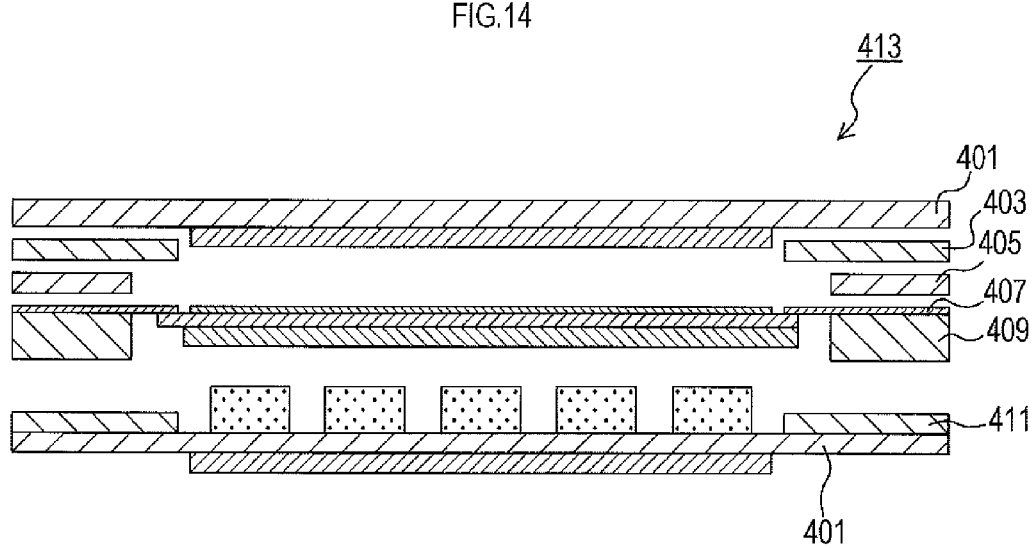
FIG. 14 is an exploded explanatory view showing a fuel battery cell according to a first comparative example.

The solid oxide fuel cell of the first comparative example was formed of eighteen layers of fuel battery cells 413. As shown in FIG. 14, the fuel battery cell 413 includes: interconnectors 401 made of ferritic stainless and having a thickness of 0.3-2.0 mm; a gas sealing part 403 made of mica and having a thickness of 0.2-1.0 mm (however, second gas flowing paths are not formed); an air electrode frame 405 made of ferritic stainless and having a thickness of 0.3-1.5 mm, in which second gas flowing paths are formed; a separator 407 made of ferritic stainless and having a thickness of 0.02-0.30 mm; a fuel electrode frame 409 made of ferritic stainless and having a thickness of 1.0-3.0 mm, in which second gas flowing paths are formed; a gas sealing part 411 made of mica and having a thickness of 0.2-1.0 mm (however, second gas flowing paths are not formed); and so on.

Figure 15A:
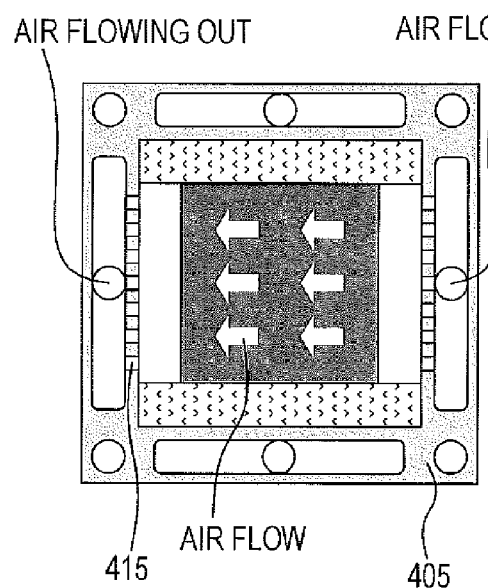
FIG. 15A is an explanatory view showing a flow of air at a side of an air electrode.
Figure 15B:
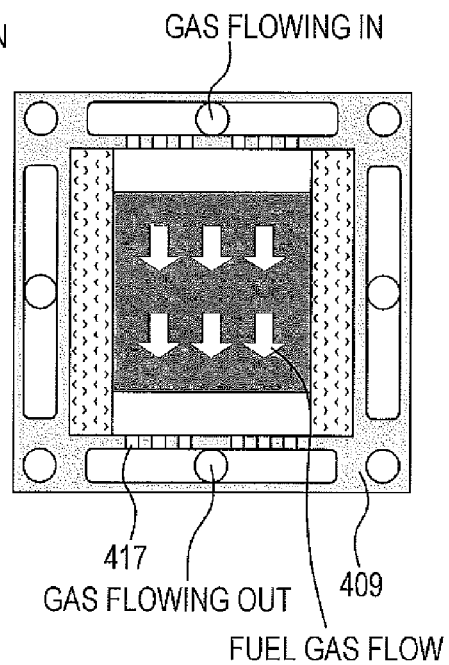
FIG. 15B is an explanatory view showing a flow of fuel gas at a side of a fuel electrode.

In the first comparative example, as shown in FIGS. 15A-15B, the second gas flowing paths which are flowing paths for air or fuel gas are formed in the air electrode frame 405 and the fuel electrode frame 409. However, the second gas flowing paths do not penetrate the air electrode frame 405 and the fuel electrode frame 409 in respective plate-thickness directions thereof; the second gas flowing paths are formed as grooves 415 and 417 formed on respective surfaces of the air electrode frame 405 and the fuel electrode frame 409.

Then, by using the solid oxide fuel cell of the first comparative example, electricity generation was performed under an operating condition of 700° C. and 65 A.

In the first comparative example, a number of the air electrode frames 405 increased and accordingly, a thickness of the stack increased. Therefore, a difference in temperature distribution between a central part and a side-edge part of the stack when electricity was generated was greater, compared with the first embodiment.

Specifically, in the first embodiment, a difference in temperature distribution was about 30° C., while in the first comparative example, the difference in temperature distribution was about 80° C.

Moreover, a period of time from when the stack is started to be operated to when the temperature reaches a rated temperature was increased, compared with the first embodiment.

Specifically, in the first embodiment, a warm-up time to reach 700° C. which is a temperature where electricity generation starts was two hours. On the other hand, the warm-up time was four hours in the first comparative example.

(2) Second Comparative Example

The solid oxide fuel cell of the second comparative example was formed of eighteen layers of fuel battery cells 511. As shown in FIG. 16, the fuel battery cell 511 includes: interconnectors 501 and 502 made of ferritic stainless and having a thickness of 0.8-2.5 mm; a gas sealing part 503 made of mica and having a thickness of 0.2-1.0 mm (however, second gas flowing paths are not formed); a separator 505 made of ferritic stainless and having a thickness of 0.02-0.30 mm; a fuel electrode frame 507 made of ferritic stainless and having a thickness of 0.5-2.0 mm; a gas sealing part 509 made of mica and having a thickness of 0.2-1.0 mm (however, second gas flowing paths are not formed); and so on.

In the second comparative example, as shown in FIGS. 17A-17B, the second gas flowing paths which are flowing paths for air or fuel gas are formed in the interconnectors 501 and 502. However, the second gas flowing paths do not penetrate the interconnectors 501 and 502 in respective plate-thickness directions thereof; the second gas flowing paths are formed as grooves 513 and 515 formed (by half-etching) on surfaces of the interconnectors 501 and 502. Here, central parts highlighted in gray of the interconnectors 501 and 502 are, respectively, a collector 521 in a side where an air electrode is provided and a collector 523 in a side where a fuel electrode is provided.

Then, by using the solid oxide fuel cell of the second comparative example, electricity generation was performed under an operating condition of 700° C. and 65 A.

In the second comparative example, since it was necessary to form the flowing paths in the interconnectors 501 and 502, a thickness of the interconnectors 501 and 502 increased and accordingly, a thickness of the stack increased. Therefore, a difference in temperature distribution between a central part and a side-edge part of the stack when electricity was generated was greater, compared with the first embodiment.

Specifically, in the first embodiment, the difference in temperature distribution was about 30° C., while in the second comparative example, the difference in temperature distribution was about 80° C.

Moreover, a period of time from when the stack is started to be operated to when the temperature reaches a rated temperature was increased, compared with the first embodiment.

Specifically, in the first embodiment, the warm-up time to reach 700° C. which is a temperature where electricity generation starts was two hours. On the other hand, the warm-up time was four hours in the second comparative example.

As above, the embodiments of the present invention have been explained. However, the present invention should not be limited to the above described embodiments, but may be practiced in various forms.

For example, the insulating member used in the third embodiment may be used in the first and second embodiments by being disposed at the same position (e.g., either at the side where the air electrode is provided or the side where the fuel electrode is provided, between the gas sealing part and the separator).

The invention claimed is:

1. A solid oxide fuel cell comprising:
a fuel cell stack composed of a plurality of plate-like electricity generation cells stacked therein by way of an interconnector; and
gas flowing paths which are configured to flow, respectively, an oxidant gas and a fuel gas in a direction of the stacking in the fuel cell stack and which are configured to be communicated with the respective electricity generation cells,
wherein each of the plurality of electricity generation cells includes:
a solid oxide;
a cathode to be in contact with the oxidant gas;
an anode to be in contact with the fuel gas;
a separator that is configured to separate between a side of the cathode and a side of the anode; and
a gas sealing part comprising: an opening in a central area thereof; and a frame part, the gas sealing part being disposed, between the interconnector and the separator, on at least one of the side of the cathode and the side of the anode,
wherein the gas sealing part includes:
a first gas flowing path that penetrates the gas sealing part in the direction of the stacking to constitute a part of the gas flowing paths, and
a second gas flowing path that extends along a plane direction of the gas sealing part, that communicates with the opening of the gas sealing part, and that does not communicate with the first gas flowing path in the gas sealing part,
wherein there is provided a member to be stacked on at least one of both sides of the gas sealing part in a thickness direction of the gas sealing part, and the member to be stacked includes a third gas flowing path through which the first gas flowing path communicates with the second gas flowing path, and
wherein the second gas flowing path penetrates through the gas sealing part in the thickness direction of the gas sealing part.

2. The solid oxide fuel cell according to claim 1, wherein the gas sealing part is in contact with the separator.

3. The solid oxide fuel cell according to claim 1,
wherein the second gas flowing path formed in the gas sealing part is provided to be bilaterally symmetrical with respect to the first gas flowing path when the gas sealing part is viewed from the thickness direction of the gas sealing part.

4. The solid oxide fuel cell according to claim 1,
wherein an insulating member is disposed at a position which is on at least one of the both sides of the gas sealing part in the thickness direction of the gas sealing part and which at least corresponds to the second gas flowing path.

5. The solid oxide fuel cell according to claim 4, wherein the insulating member is disposed at the side of the cathode.

6. The solid oxide fuel cell according to claim 4, wherein the insulating member is composed of mica or vermiculite.

7. The solid oxide fuel cell according to claim 1, wherein the gas sealing part is composed of mica or vermiculite.

8. The solid oxide fuel cell according to claim 1, wherein the third gas flowing path is branched from the first gas flowing path at a branch point A, and
- wherein a pressure drop index ($\Delta PA1$) on a downstream side of the branch point A in the first gas flowing path is smaller than a pressure drop index ($\Delta PA3$) on a downstream side of the branch point A in the third gas flowing path.

9. The solid oxide fuel cell according to claim 1, wherein the second gas flowing path is branched from the third gas flowing path at a branch point B, and
- wherein a pressure drop index ($\Delta PB3$) on a downstream side of the branch point B of the third gas flowing path is smaller than a pressure drop index ($\Delta PB2$) on a downstream side of the branch point B in the second gas flowing path.

10. The solid oxide fuel cell according to claim 1,
- wherein the first gas flowing path, the second gas flowing path, or the third gas flowing path is formed by pressing processing or laser treatment.

* * * * *